United States Patent
Yao et al.

(10) Patent No.: US 11,216,185 B2
(45) Date of Patent: *Jan. 4, 2022

(54) MEMORY SYSTEM AND METHOD OF CONTROLLING MEMORY SYSTEM

(71) Applicant: Toshiba Memory Corporation, Tokyo (JP)

(72) Inventors: Hiroshi Yao, Kanagawa (JP); Shinichi Kanno, Tokyo (JP); Kazuhiro Fukutomi, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,956

(22) Filed: Sep. 11, 2020

(65) Prior Publication Data

US 2020/0409555 A1 Dec. 31, 2020

Related U.S. Application Data

(63) Continuation of application No. 16/044,257, filed on Jul. 24, 2018, now Pat. No. 10,871,900, which is a (Continued)

(30) Foreign Application Priority Data

Sep. 24, 2010 (JP) ................................ 2010-214221

(51) Int. Cl.
 *G06F 12/00* (2006.01)
 *G06F 3/06* (2006.01)
 *G06F 12/02* (2006.01)

(52) U.S. Cl.
 CPC .......... *G06F 3/0604* (2013.01); *G06F 3/0634* (2013.01); *G06F 3/0641* (2013.01); (Continued)

(58) Field of Classification Search
 CPC ...... G06F 3/0619; G06F 3/061; G06F 3/0655; G06F 3/0688; G06F 12/0811
 See application file for complete search history.

(56) References Cited

U.S. PATENT DOCUMENTS 5,671,388 A 9/1997 Hasbun
2004/0268098 A1 12/2004 Almog
(Continued)

FOREIGN PATENT DOCUMENTS

CN 101154189 A 4/2008
JP 2008-257773 10/2008
(Continued)

OTHER PUBLICATIONS

Office Action issued in European Patent Application No. 11177759.5 dated Jun. 23, 2016.
(Continued)

*Primary Examiner* — Gurtej Bansal
(74) *Attorney, Agent, or Firm* — Oblon, McClelland, Maier & Neustadt, L.L.P.

(57) ABSTRACT

According to one embodiment, a memory system includes a non-volatile semiconductor memory, a block management unit, and a transcription unit. The semiconductor memory includes a plurality of blocks to which data can be written in both the first mode and the second mode. The block management unit manages a block that stores therein no valid data as a free block. When the number of free blocks managed by the block management unit is smaller than or equal to a predetermined threshold value, the transcription unit selects one or more used blocks that stores therein valid data as transcription source blocks and transcribes valid data stored in the transcription source blocks to free blocks in the second mode.

20 Claims, 19 Drawing Sheets

Related U.S. Application Data continuation of application No. 15/880,168, filed on Jan. 25, 2018, now Pat. No. 10,055,132, which is a continuation of application No. 15/391,184, filed on Dec. 27, 2016, now Pat. No. 9,910,597, which is a continuation of application No. 14/467,685, filed on Aug. 25, 2014, now Pat. No. 10,877,664, which is a continuation of application No. 13/038,681, filed on Mar. 2, 2011, now Pat. No. 8,832,357.

(52) U.S. Cl.
CPC .......... *G06F 3/0659* (2013.01); *G06F 3/0679* (2013.01); *G06F 12/0246* (2013.01); *G06F 2212/1016* (2013.01); *G06F 2212/1024* (2013.01); *G06F 2212/1044* (2013.01); *G06F 2212/214* (2013.01); *G06F 2212/7201* (2013.01); *G06F 2212/7205* (2013.01)

(56) References Cited

U.S. PATENT DOCUMENTS

| | | |
|---|---|---|
| 2006/0080353 A1 | 4/2006 | Miloushev |
| 2006/0155917 A1 | 7/2006 | Sena |
| 2006/0179236 A1 | 8/2006 | Shafi |
| 2008/0077729 A1 | 3/2008 | Kim |
| 2008/0104309 A1 | 5/2008 | Cheon |
| 2008/0172520 A1 | 7/2008 | Lee |
| 2008/0209109 A1 | 8/2008 | Lasser |
| 2008/0244164 A1 | 10/2008 | Chang |
| 2008/0279005 A1 | 11/2008 | France |
| 2008/0282024 A1 | 11/2008 | Biswas |
| 2009/0070520 A1 | 3/2009 | Mizushima |
| 2009/0157974 A1 | 6/2009 | Lasser |
| 2009/0204746 A1 | 8/2009 | Chen |
| 2009/0248965 A1 | 10/2009 | Lee |
| 2009/0251982 A1 | 10/2009 | Ware |
| 2009/0307418 A1 | 12/2009 | Chen |
| 2010/0122016 A1 | 5/2010 | Marotta |
| 2010/0169540 A1 | 7/2010 | Sinclair |
| 2010/0205352 A1 | 8/2010 | Chu |
| 2011/0219180 A1 | 9/2011 | Cheon |
| 2011/0225347 A1 | 9/2011 | Goss |

FOREIGN PATENT DOCUMENTS

| | | |
|---|---|---|
| JP | 2008-276733 | 11/2008 |
| JP | 2009-217756 A | 9/2009 |
| JP | 2010-152778 | 7/2010 |
| JP | 2010-157142 A | 7/2010 |

OTHER PUBLICATIONS

Office Action issued in Chinese Patent Application No. 201110256131.2 dated Jun. 24, 2014 (w/ English translation).
Chinese Office Action issued in Chinese Application No. 201110256131.2 dated Nov. 4, 2013 (w/ English translation).
Office Action issued in Japanese Patent Application No. 2010-214221 dated Apr. 24, 2012 (w/ English translation).
Extended European Search Report issued in Patent Application No. 11177759.5 dated Mar. 13, 2012.

FIG.10
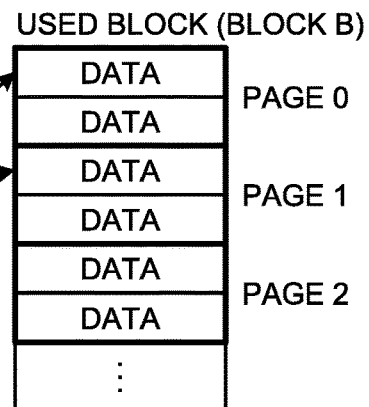
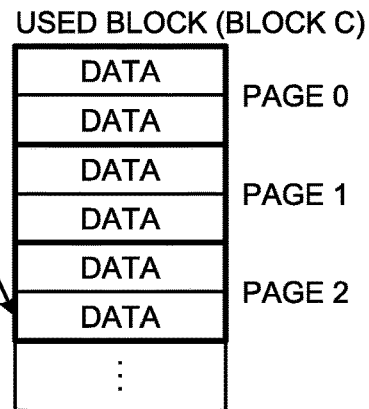
FIG.11
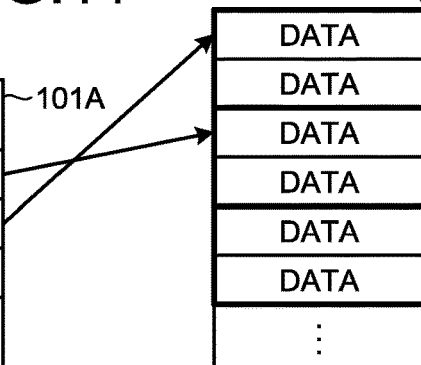
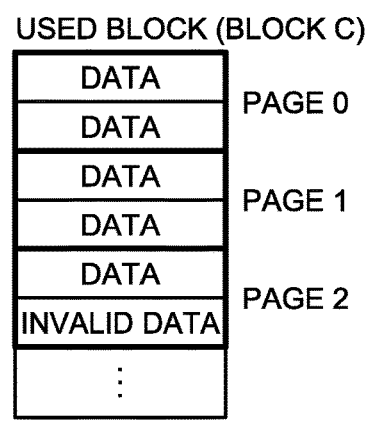

MEMORY SYSTEM AND METHOD OF CONTROLLING MEMORY SYSTEM

CROSS-REFERENCE TO RELATED APPLICATIONS

This is a continuation application of U.S. application Ser. No. 16/044,257 filed Jul. 24, 2018, which is a continuation application of U.S. application Ser. No. 15/880,168 filed Jan. 25, 2018, (now U.S. Pat. No. 10,055,132 issued Aug. 21, 2018), which is a continuation of U.S. application Ser. No. 15/391,184 filed Dec. 27, 2016, (now U.S. Pat. No. 9,910, 597 issued Mar. 6, 2018), which is a continuation of U.S. application Ser. No. 14/467,685 filed Aug. 25, 2014, which is a continuation of U.S. application Ser. No. 13/038,681 filed Mar. 2, 2011 (now U.S. Pat. No. 8,832,357 issued Sep. 9, 2014), which is based upon and claims the benefit of priority from Japanese Patent Application No. 2010-214221, filed Sep. 24, 2010, the entire contents of each of which are incorporated herein by reference.

FIELD

Embodiments described herein relate generally to a memory system.

BACKGROUND

As a technique to expand the capacity of a NAND flash memory, there is a multi-level recording (MLC: Multi-Level Cell) method. In this disclosure, a flash memory of the MLC method is referred to as an MLC flash memory, and a flash memory of a binary recording (SLC: Single-Level Cell) method is referred to as an SLC flash memory. In the SLC method (hereinafter referred to as SLC mode), one bit is recorded in one cell which is a unit of recording. On the other hand, in the MLC method (hereinafter referred to as MLC mode), N bits (N>1) can be recorded in one cell. Therefore, for example, in an MLC flash memory of two-bit recording, one cell can represent four values, and in an MLC flash memory of three-bit recording, one cell can represent eight values.

Such flash memories that can store relatively large amount of information in a certain storage area can have the recording capacity per volume larger than that of a flash memory that can store relatively small amount of information in the same storage area, and have a merit that the cost per storage capacity can be reduced. In contrast, a flash memory that can store relatively small amount of information in a certain storage area has a merit that the access time for reading and writing is short and the memory has high reliability compared with a flash memory that can store relatively large amount of information in the same storage area.

BRIEF DESCRIPTION OF THE DRAWINGS

FIG. 10 is an illustration of a mapping update when data is deleted in the embodiment (before deletion);
FIG. 11 is an illustration of a mapping update when data is deleted in the embodiment (after deletion)

DETAILED DESCRIPTION

Figure 1:
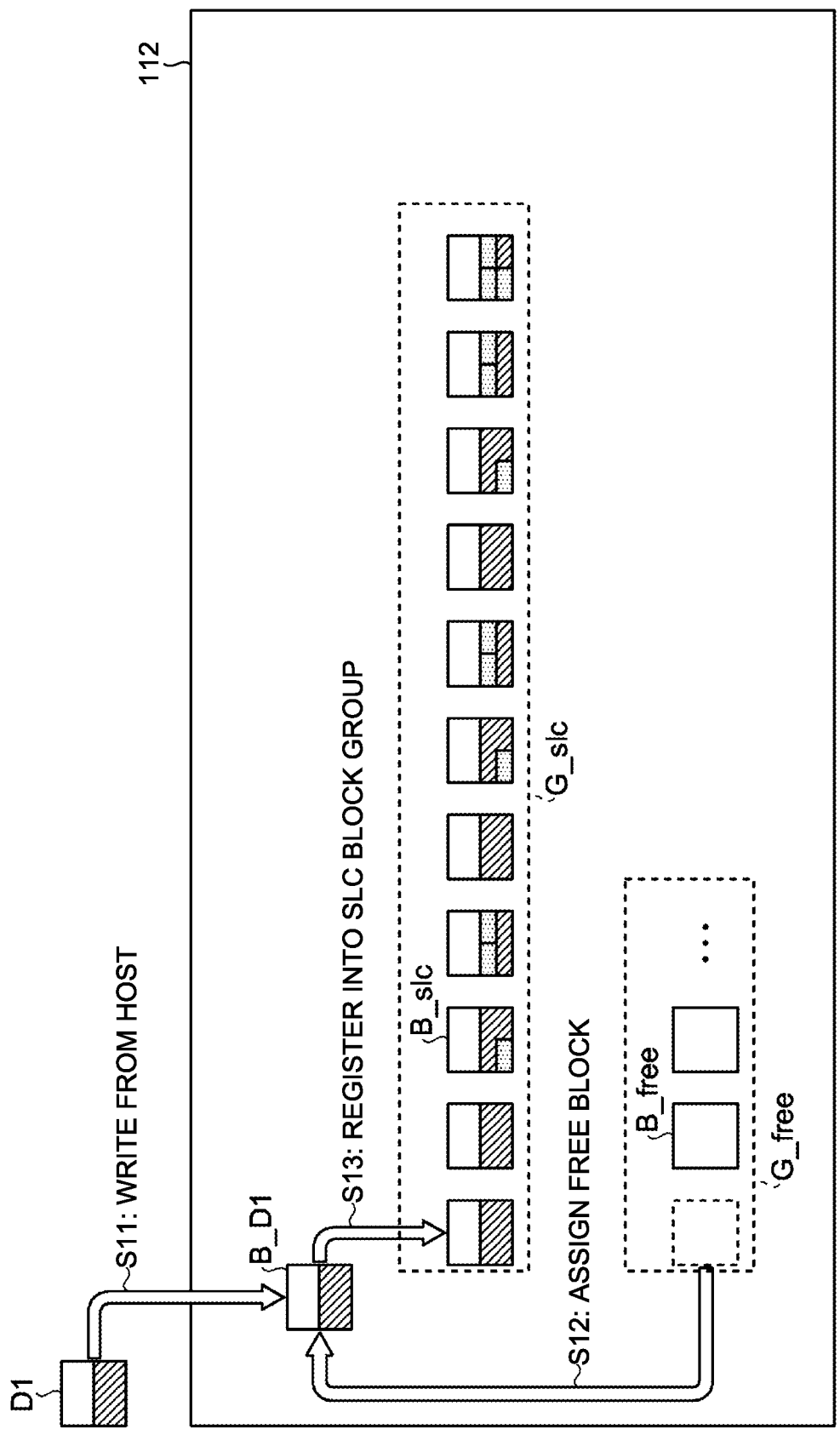
FIG. 1 is a diagram (1) showing a use example of a block of a first embodiment.

According to one embodiment, a memory system includes a non-volatile semiconductor memory, a first storage unit, a second storage unit, a third storage unit, a first receiving unit, an acquisition unit, a first write unit, a selection unit, a second write unit, a management information update unit, a second receiving unit, and a read unit. The non-volatile semiconductor memory includes a plurality of first storage areas, and is capable of having one or more second storage areas which are included in the plurality of first storage areas and in which no valid data is stored, a plurality of third storage areas which are included in the plurality of first storage areas and which are obtained by copying and storing therein data received from a host, and a plurality of fourth storage areas which are obtained by copying and storing therein data stored in the third storage areas or stored in the fourth storage areas. The valid data is data stored at a physical address associated with a logical address. The logical address is an address specified from the host. The physical address indicates a data storage position in a storage area of a semiconductor memory. The first storage unit stores therein first management information that indicates which area of the plurality of first storage areas is the second storage area. The second storage unit stores therein second management information that indicates which areas of the plurality of first storage areas are the third storage areas. The third storage unit stores therein third management information that indicates which areas of the plurality of first storage areas are the fourth storage areas. The first receiving unit receives write request data which is data requested to be written by the host. The acquisition unit acquires one second storage area from the one or more second storage areas on the basis of the first management information. The first write unit writes the write request data to the second storage area acquired by the acquisition unit in a first mode. When the number of the second storage areas is smaller than or equal to a first threshold value, the selection unit selects one or more storage areas from the plurality of third storage areas on the basis of the second management information or select one or more storage areas from the plurality of fourth storage areas on the basis of the third management information. The second write unit writes valid data stored in the storage area selected by the selection unit to the second storage area acquired by the acquisition unit in a second mode. When the second write unit writes the valid data, the management information update unit deletes the selected storage area from the second management information or the third management information and adds the selected storage area to the first management information. The second receiving unit receives a read request of data from the host. The read unit reads data in the first mode when data requested to be read by the read request is written to the third storage area and reads data in the second mode when data requested to be read by the read request is written to the fourth storage area. A write speed or a read speed in the first mode is faster than that in the second mode. A maximum amount of information that can be written in a same storage area in the first mode is smaller than that in the second mode.

Various embodiments will be described hereinafter with reference to the accompanying drawings.

Figure 2:
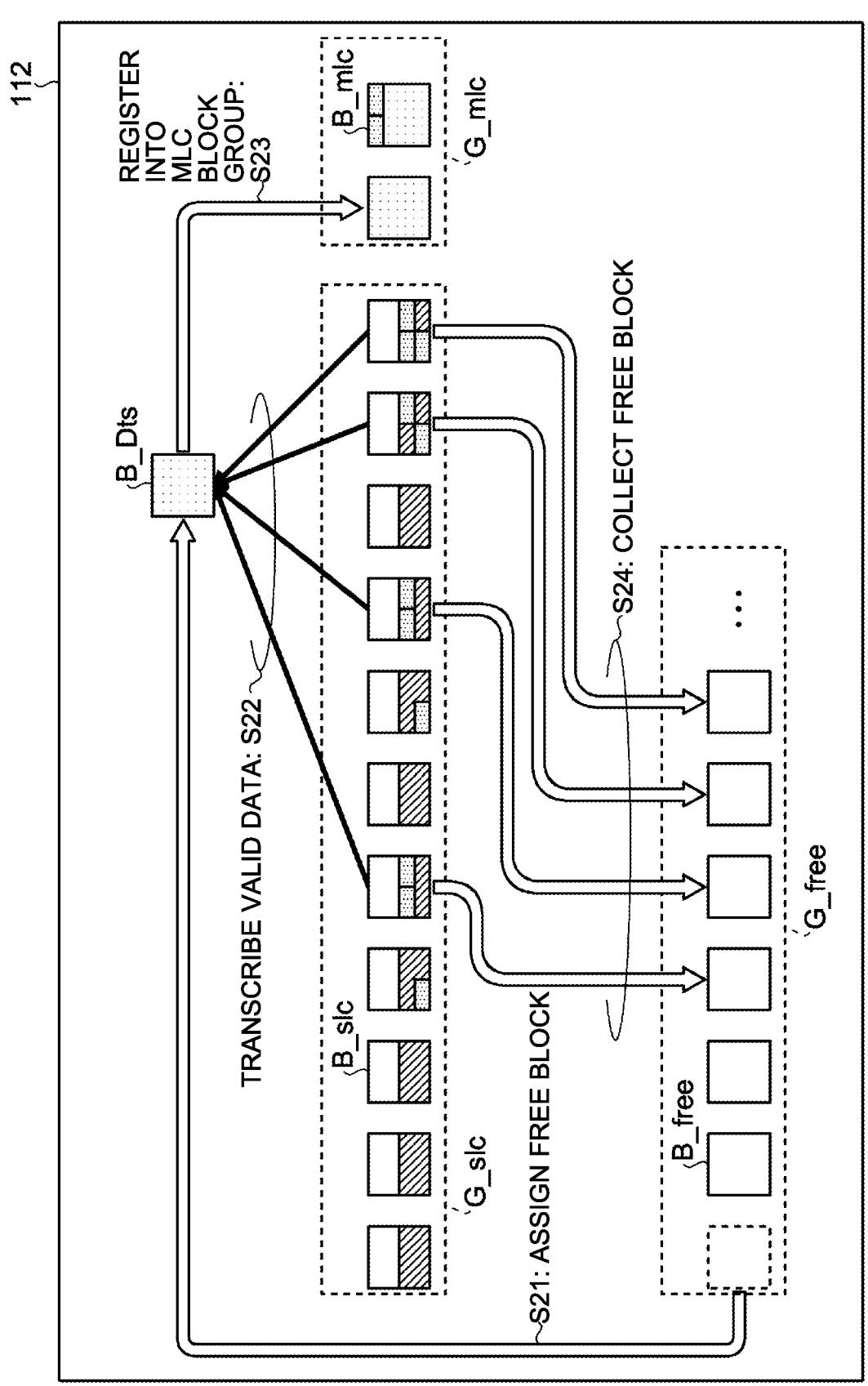
FIG. 2 is a diagram (2) showing a use example of a block of the embodiment.
Figure 3:
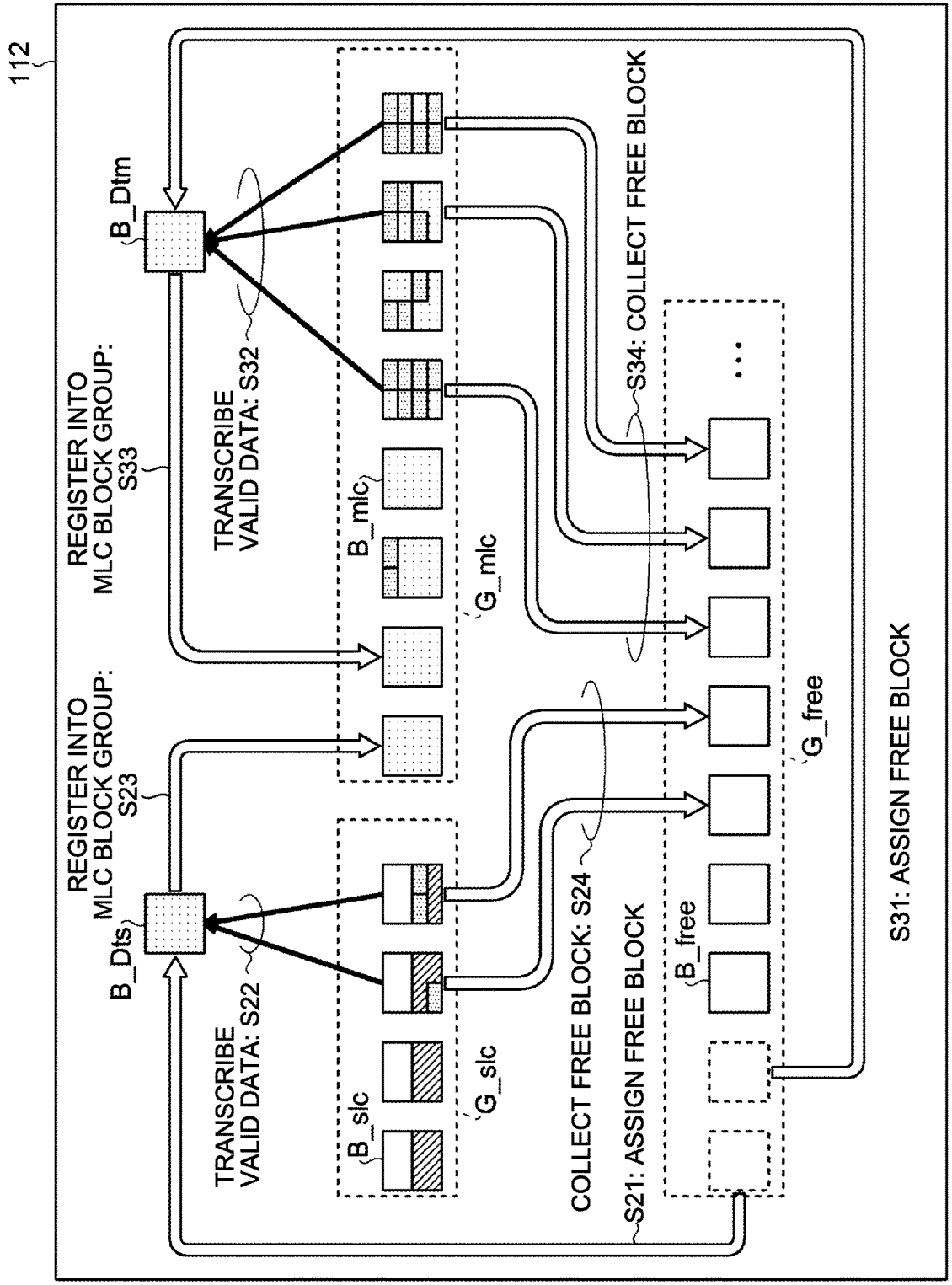
FIG. 3 is a diagram (3) showing a use example of a block of the embodiment.

First, a memory system 1 according to a first embodiment will be described in detail with reference to the drawings. FIGS. 1 to 3 are diagrams showing a use example of blocks according to the first embodiment.

A NAND flash memory used in the first embodiment is a flash memory 112 that can change operation mode of writing data. For example, the flash memory is an MLC flash memory that can change operation mode of writing data. As the operation mode, a first operation mode and a second operation mode are used. In the first operation mode, the amount of information written to a certain storage area is smaller than that in the second operation mode (in other words, in the second operation mode, the amount of information written to a certain storage area is greater than that in the first operation mode). For example, the second operation mode is a mode in which the number of bits that can be written to one cell is greater than that in the first operation mode. In a more specific example, the first operation mode is an SLC mode or an MLC mode. The second operation mode is an MLC mode in which the number of bits that can be written to one cell is greater than that in the first operation mode. In the description below, it is assumed that the first operation mode is the SLC mode and the second operation mode is the MLC mode. However, the MLC mode is not limited to a single mode, but there may be a plurality of MLC modes. For example, the MLC mode may be changed between four-value mode and eight-value mode.

A storage area of not only the MLC flash memory 112 but also a NAND flash memory includes a plurality of blocks (first storage areas). The block is a predetermined unit of storage area, and a unit of data to be erased. Therefore, when newly writing data to a block, data in the block needs to be collectively erased in advance.

Each block includes a plural of pages. Data is written and read to and from each page. There is a rule of an order of writing data to pages. Therefore, after erasing data in a block, it is necessary to write data to the block in a specific page order. In other words, after data is written to a block, it is impossible to overwrite data to a specific page without erasing data in the block, and even after erasing data from the block, it is impossible to write data to a random page in the block.

The operation mode of each NAND flash memory can be set independently for each block. However, operation modes of each page in a block need to be the same. Therefore, operation mode cannot be switched between the pages. In other words, after data is written to a page in a block, the operation mode of the block cannot be switched until the data in the block is collectively erased.

The amount of data that can be written to a block is different among each operation mode. In other words, the capacity of a block (hereinafter referred to as block capacity) varies depending on the operation mode.

Specifically, the page size of each page does not vary, and the number of pages varies. For example, in an MLC flash memory of two-bit recording method, an SLC block of two-value mode has the number of pages and the block capacity that are ½ times of those of an MLC block of four-value mode.

In the first embodiment, as shown in FIGS. 1 to 3, as the type of block, there are free blocks (second storage area) B_free in which no valid data is stored and used blocks in which valid data is stored. Among the used blocks, there are blocks B_slc which is obtained by copying and storing therein valid data written in the first operation mode and blocks B_mlc which is obtained by copying and storing therein data written in the second operation mode. Herein, the block B_slc is referred to as an SLC block B_slc (third storage area), and the block B_mlc is referred to as an MLC block B_mlc (fourth storage area).

The blocks are classified into groups, and managed. For example, the free block B_free is classified into a free block group G_free and managed, the SLC block B_slc is classified into an SLC block group G_slc (fifth storage area) and managed, and the MLC block B_mlc is classified into an MLC block group G_mlc (sixth storage area) and managed.

In the first embodiment, as shown in FIG. 1, when a request of writing data Dl is issued from a host device, the data Dl is written in the SLC mode to a free block B_free which is assigned in advance as a block to which new data is to be written. A new data written block B Dl to which the data Dl is written is registered as the SLC block group G_slc. As a result, the number of free blocks B_free managed in the free block group G_free decreases by 1, and instead of that, the number of SLC blocks B_slc managed in the SLC block group G_slc increases by 1. The writing of data in the SLC mode is performed without being limited by the total data capacity of the SLC blocks B_slc managed in the SLC block group G_slc. In other words, in the first embodiment, the number of SLC blocks B_slc has no upper limit and is variable. Based on this, in the first embodiment, a variable-length SLC buffer is implemented. Further, in the first embodiment, the number of blocks, whose total capacity is greater than or equal to a surplus capacity (generally referred to as Over-Provisioning) obtained by subtracting the logical capacity that is a maximum capacity provided to the host device from the total storage capacity of the MLC flash memory, can be managed as the SLC blocks B_slc. However, as described below, a lower limit may be set to the number of the free blocks B_free managed by the free block group G_free.

Thereafter, for example, when the number of the free blocks B_free belonging to the free block group G_free becomes smaller than or equal to a predetermined threshold value Tbf by writing data from the host device, in the first embodiment, as shown in FIG. 2, some of the SLC blocks B_slc belonging to the SLC block group G_slc are selected, and data stored in these SLC blocks B_slc as valid data (hereinafter referred to as valid data) is written in the MLC mode to a free block B_free assigned in advance as a transcription destination block (transcription). The transcription destination block B_Dts to which the valid data is written is registered as the MLC block group G_mlc. As a result, the number of the used blocks decreases, and the number of the free blocks B_free increases. Here, as an SLC block B_slc to be transcribed, it is desired to select an SLC block B_slc in which the amount of valid data (rate of valid data) is small with respect to the block capacity and an SLC block B_slc which does not store data that is frequently updated.

Thereafter, in a state in which the number of the MLC blocks B_mlc belonging to the MLC block group G_mlc has increased by the data transcription, when the number of the free blocks B_free becomes smaller than or equal to the predetermined threshold value Tbf, in the first embodiment, as shown in FIG. 3, either the SLC block group G_slc or the MLC block group G_mlc is selected, some of blocks belonging to the selected block group are selected, and valid data in the selected blocks is written in the MLC mode to a free block B_free assigned in advance as a transcription destination block (transcription). The transcription destination block B_Dts or B_Dtm to which the valid data is written is registered as the MLC block group G_mlc. As a result, the number of the used blocks decreases, and the number of the free blocks B_free increases. Here, as a used block to be transcribed, it is desired to select a block in which the amount of valid data (rate of valid data) is small with respect to the block capacity and a block which does not store data that is frequently updated. As blocks to be transcribed, for example, blocks of the same operation mode are selected. Specifically, a set of SLC blocks B_slc or a set of MLC blocks B_mlc is selected.

It is possible to determine which block group is selected on the basis of various parameters such as the total amount of valid data and the total rate of valid data of the blocks belonging to each block group. For example, as shown in FIGS. 1 and 2, when the total amount of valid data is small, it is possible to raise the ratio of the SLC blocks B_slc because all data can be recorded even if the sum of the block capacities is small. On the other hand, as shown in FIG. 3, when the total amount of valid data is large, it is necessary to raise the ratio of the MLC blocks B_mlc to increase the sum of the block capacities.

Further, when there is locality in LBA (Logical Block Address) of the data written from the host, in other words, when the data is intensively written to a range of specific LBAs, it is highly likely that the data is overwritten from the host before the data is transcribed from the SLC block B_slc to the MLC block B_mlc and the old data in the SLC block B_slc becomes invalid data. In the manner as described above, when the total rate of valid data in the SLC block group G_slc decreases, it is desired that the SLC block group G_slc is selected as the block group to be transcribed. In contrast, for example, when the locality moves, in other words, immediately after the range of LBAs to which the data is intensively written has moved to another range, it is highly likely that the data is overwritten from the host after the data is transcribed to the MLC block B_mlc and the old data in the MLC block B_mlc becomes invalid data. In the manner as described above, when the total rate of valid data in the MLC block group G_mlc decreases, it is desired that the MLC block group G_mlc is selected as the block group to be transcribed.

Here, the threshold value Tbf is a value obtained by experiments, experiences, or simulations in order to implement efficient data access from the host device. For example, if the threshold value Tbf is too large, at a certain time point, the number of blocks which actually store data decreases and the total rate of valid data increases, so that the efficiency of transcription degrades. The threshold value Tbf needs to be at least the number of free blocks allocated at the same time for the transcription processing.

Further, the trigger of performing data transcription is not limited to the method using the threshold value Tbf. For example, the data transcription may be performed periodically, or the data transcription may be performed on the basis of a time period when there is no access from the host device.

Figure 4:
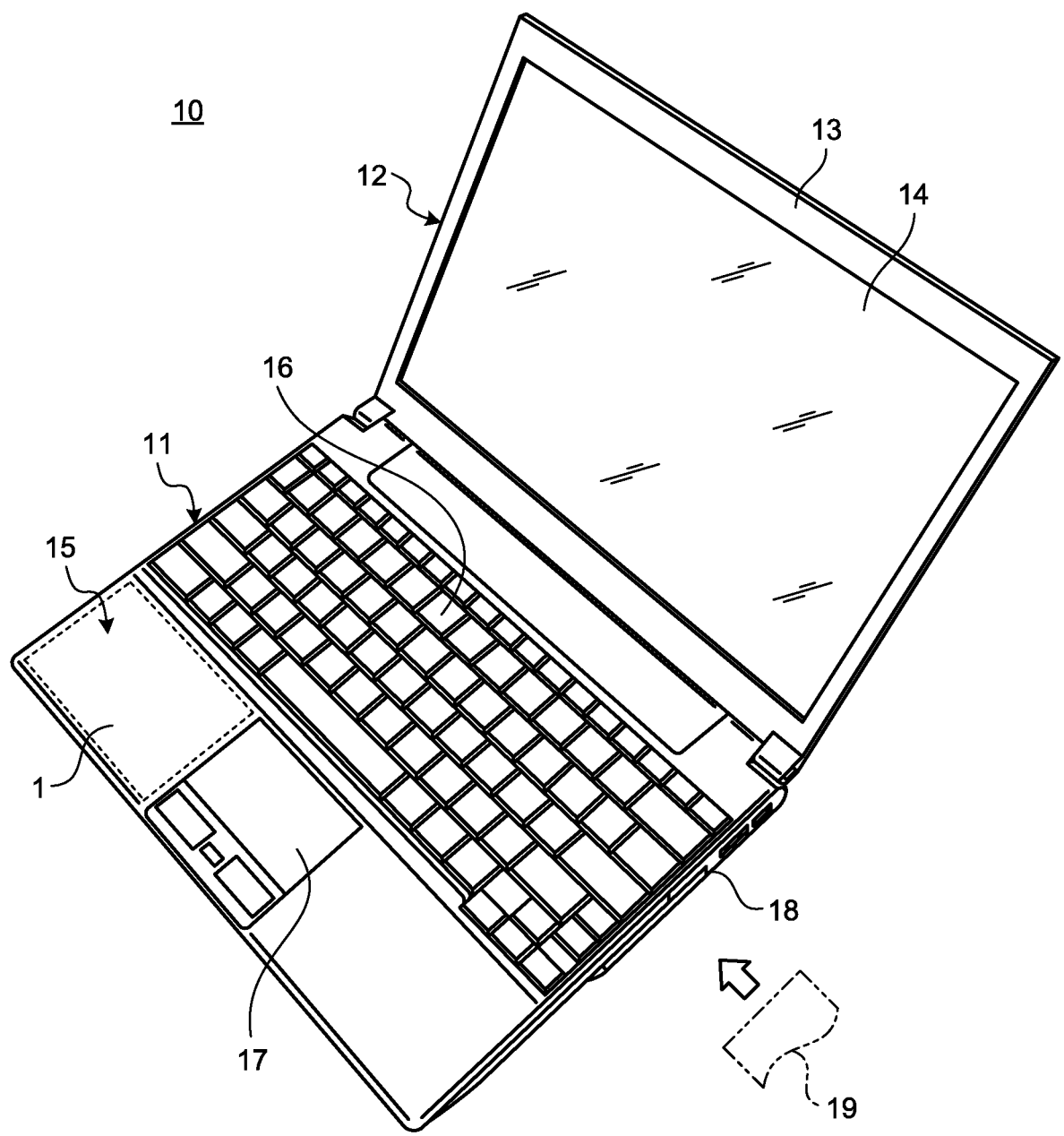
FIG. 4 is an external view of a personal computer of the embodiment.

Next, a configuration and an operation of the memory system 1 will be described. FIG. 4 is a schematic diagram showing an example of an information processing apparatus in which the memory system according to the first embodiment can be mounted. A personal computer 10 illustrated in FIG. 4 mainly includes a main body 11 and a display unit 12. The main body 11 includes, for example, a housing 15, a keyboard 16, a touchpad 17 which is a pointing device, an external interface 18 such as a card slot to which a memory card 19 or the like can be attached and detached and a USB (Universal Serial Bus), a main circuit board, and the memory system 1 which is an SSD (Solid State Drive).

On the main circuit board, main components such as a CPU (Central Processing Unit), a ROM (Read Only Memory), a RAM (Random Access Memory), a Northbridge, and a Southbridge are mounted. In addition, the main body 11 may include an ODD (Optical Disk Drive) unit, various external interfaces, and the like.

The display unit 12 includes a display housing 13 and a display device 14 contained in the display housing 13. Although, in FIG. 4, a notebook type personal computer is used as an example, the information processing apparatus in which the memory system according to the first embodiment can be mounted is not limited to this. In other words, the memory system according to the first embodiment and another embodiment described below can be applied to any computer where a flash memory can be mounted or attached as storage.

In FIG. 4, the memory system 1 is a storage device using a rewritable non-volatile memory as a recording medium. The memory system 1 may be built into the personal computer 10 or externally connected to the personal computer 10 via the external interface 18. Hereinafter, the memory system 1 according to the first embodiment will be described in detail with reference to the drawings.

Figure 5:
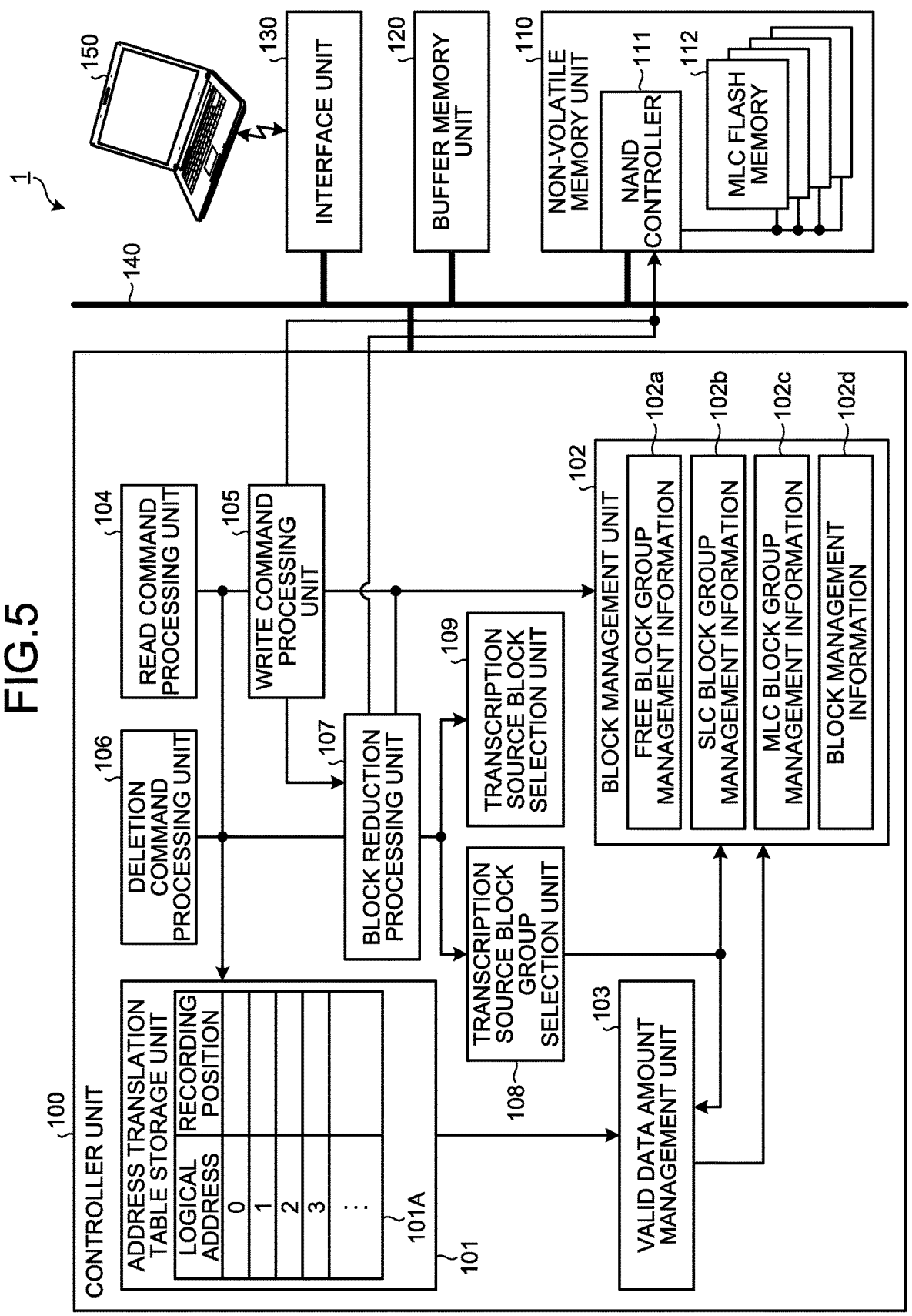
FIG. 5 is a block diagram of a memory system of the embodiment.

As shown in FIG. 5, the memory system 1 roughly includes a controller unit 100, a non-volatile memory unit 110, a buffer memory unit 120, and an interface unit 130. Each unit 100 to 130 can be connected to each other via a signal line 140 such as a bus or a point-to-point line. A host device 150 such as a personal computer or a workstation that requests writing and reading of data to and from the non-volatile memory unit 110 can also be connected to the signal line 140.

The interface unit 130 is, for example, a SATA (Serial ATA) interface, and communicates with the host device 150 via the signal line 140. However, the interface unit 130 is not limited to the SATA interface, but various interfaces such as a parallel ATA interface can be applied to the interface unit 130. The interface unit 130 receives commands such as read, write, flush, and deletion of data (e.g., the SATA TRIM command) from the host device 150 (first receiving unit and second receiving unit), and transmits a notification of receiving command to the controller unit 100. The interface unit 130 transmits and receives data to and from the host device 150 in accordance with an instruction from the controller unit 100.

For the buffer memory unit 120, a high-speed memory having high random accessibility such as SRAM and DRAM is used. The buffer memory unit 120 need not be a non-volatile memory. The buffer memory unit 120 temporarily stores therein data transmitted or received to or from the host device 150 by the interface unit 130 and data read or written from or to the non-volatile memory unit 110 by the interface unit 130. The buffer memory unit 120 may store therein information for various management operations in addition to data.

The non-volatile memory unit 110 includes one or more MLC flash memories 112 and a NAND controller 111. The MLC flash memory 112 is, for example, a NAND flash memory. One MLC flash memory 112 may be formed in one chip. Usually, the total storage capacity of the non-volatile memory unit 110 needs to be greater than the logical capacity (maximum capacity provided to the host device). Therefore, the non-volatile memory unit 110 can include a plurality of MLC flash memories 112 according to the total storage capacity. It is desired that the NAND controller 111 can transmit data to a plurality of MLC flash memories 112 in parallel. This is effective when the data transmission performance required as an SSD cannot be satisfied by using one MLC flash memory 112.

The description returns to FIG. 5. The controller unit 100 has functions to manage user data and control each unit. The controller unit 100 may be a SoC (System on a Chip) in which these functions are implemented as a circuit. The controller unit 100 may be implemented by a general purpose hardware processor executing software for implementing these functions.

As these function blocks, the controller unit 100 includes an address translation table storage unit 101, a block management unit 102, a valid data amount management unit 103, a read command processing unit 104, a write command processing unit 105, a deletion command processing unit 106, a block reduction processing unit 107, a transcription source block group selection unit 108, and a transcription source block selection unit 109 (transcription unit).

The address translation table storage unit 101 stores therein an address translation table 101A holding a mapping between logical addresses specified from the host device 150 and data recording positions in the memory system 1. When the host device 150 writes or deletes data of a certain logical address or the data is transcribed in the memory system 1, the mapping of the logical address in the address translation table 101A is updated. As a result, data in the new recording position becomes valid data, and data in the old recording position becomes invalid data. When the mapping is updated, the update of the amount of valid data in each block is notified to the valid data amount management unit 103.

The block management unit 102 manages block groups for classifying and managing blocks. A block can be classified into a free block or a used block depending on whether or not the block stores therein valid data. The used block can be classified into either an SLC block or an MLC block depending on the write operation mode of valid data to the block. The block management unit 102 assigns a block in which no valid data is stored to a free block group, assigns a block in which valid data written in the SLC mode is stored to an SLC block group, and assigns a block in which valid data written in the MLC mode is stored to an MLC block group. The block management unit 102 holds information of blocks and the number of the blocks included in each block group as management information of each block group. An operation mode of a free block is not determined, and after the free block is obtained for use, the operation mode is determined in accordance with the purpose of use. The management information of each block group has a data structure that enables all the blocks to be collectively registered as a specific block group. For example, even when all the blocks are used in the SLC mode, all the blocks can be registered as the SLC block group. The block management unit 102 updates information indicating which block belongs to which block group (free, SLC, or MLC) (management information update unit).

When the valid data amount management unit 103 receives the notification of the update of the amount of valid data in each block from the address translation table 101A, the valid data amount management unit 103 calculates the total amount of valid data of the blocks included in the SLC block group and the MLC block group.

When the read command processing unit 104 receives a notification of receiving the read command from the interface unit 130, the read command processing unit 104 searches the address translation table 101A for a recording position in the non-volatile memory unit 110 corresponding to a logical address specified by the read command, and reads data recorded in the recording position to the buffer memory unit 120 (reading unit). In this way, data in a range specified by the read command is temporarily stored in the buffer memory unit 120. Thereafter, the read command processing unit 104 controls the interface unit 130 to transmit the data temporarily stored in the buffer memory unit 120 to the host device 150.

When the write command processing unit 105 receives a notification of receiving the write command from the interface unit 130, the write command processing unit 105 allocates a free space in the buffer memory unit 120 and controls the interface unit 130 to receive data from the host device 150. Thereafter, when a sufficient amount of data is accumulated in the buffer memory unit 120, the write command processing unit 105 writes the data in the buffer memory unit 120 to a block to which new data is to be written.

Thereafter, the write command processing unit 105 updates the mapping by registering a recording position corresponding to a logical address of the written data into the address translation table 101A. The write command processing unit 105 acquires a free block as a block to which new data is to be written from the block management unit 102 (acquisition unit), and uses the block to which new data is to be written as an SLC block (first writing unit). When the write command processing unit 105 acquires a free block as a block to which new data is to be written from the block management unit 102, if the number of remaining free blocks is smaller than a predetermined threshold value, the write command processing unit 105 sends a number-of-used-blocks reduction request to the block reduction processing unit 107.

When the deletion command processing unit 106 receives a notification of receiving the deletion command from the interface unit 130, the deletion command processing unit 106 updates the mapping of the address translation table 101A so that data in a recording position corresponding to a specified logical address is invalidated.

The block reduction processing unit 107 selects at least one used block (hereinafter referred to as "transcription source block") among used blocks which store therein valid data (selection unit), and transcribes valid data in the selected transcription source blocks to a free block (second writing unit). The block group from which the number of blocks is reduced is selected by the transcription source block group selection unit 108. The transcription source blocks are selected by the transcription source block selection unit 109.

The block reduction processing unit 107 collects, as new free blocks, the transcription source blocks that become free blocks as a result of the transcription of the valid data, namely, the transcription source blocks whose amount of valid data becomes "0". The mapping of the transcribed data is updated by registering the recording position of the transcription destination corresponding to the logical address of the transcribed data into the address translation table 101A. Here, a difference between the number of the transcription source blocks collected as new free blocks and the number of free blocks assigned as blocks of transcription destination (hereinafter referred to as "transcription destination block") is the number of reduced used blocks. As the transcription source blocks, it is desired that blocks of the same operation mode are selected. The free block assigned as the transcription destination block is desired to be used in the MLC mode.

The transcription source block group selection unit 108 selects either the SLC block group or the MLC block group, from which the number of blocks is reduced. The transcription source block group selection unit 108 selects the block group from which the number of blocks is reduced on the basis of, for example, the rate of valid data in each block group or in one of the block groups. The transcription source block group selection unit 108 can calculate the rate of valid data in a block group from the number of blocks in each block group referred from the block management unit 102 and the amount of valid data in each block or in each block group referred from the valid data amount management unit 103. Specifically, the transcription source block group selection unit 108 can obtain the rate of valid data in a block group by calculating the total capacity of each block group from the operation mode and the number of blocks in each block group and dividing the amount of valid data in each block group by the calculated total capacity.

The transcription source block selection unit 109 selects one or more used blocks as the transcription source blocks from the transcription source block group selected by the transcription source block group selection unit 108. The transcription source block selection unit 109 preferentially selects a block having a low rate of valid data among the used blocks belonging to the transcription source block group. Alternatively, the transcription source block selection unit 109 may preferentially select a used block having a rate of valid data smaller than a threshold value, which is the same as the threshold value of the rate of valid data in the MLC block group, which is used when the transcription source block group selection unit 108 selects the transcription source block group. Further, when the transcription source block group is the SLC block group, the blocks may be selected simply in the order of FIFO, in other words, the SLC blocks may be selected in the time-series order of writing.

Next, a unit of data management and the address translation table will be described in detail with reference to the drawings. Generally, a unit of data management when accessing from the host device 150 to a storage apparatus is called "sector", and the size of the sector is 512 bytes. In a storage area provided from the storage apparatus such as an HDD and an SSD to the host device 150, continuous logical addresses are provided to each sector sequentially from the top of the area. Generally, the logical address is called "LBA" (Logical Block Address).

On the other hand, a unit of data management in the memory system 1 according to the first embodiment is called "cluster". The size of the cluster can be larger than the size of the sector. When the size of the cluster is larger than the size of the sector, it is possible to reduce the number of entries and the amount of processing in the address translation table 101A. For example, when one cluster includes eight sectors, each cluster includes continuous eight sectors starting from a sector having a logical address that is a multiple of eight. As a result, the size of the cluster is 4 KB (kilo byte). In the description below, an example will be described, in which a unit of data management in the memory system 1 is the cluster, the logical address of each cluster is an LBA of the first sector of the cluster, and the size of the cluster is 4 KB. However, the size of the cluster can be changed according to purpose or the like. Of course, if an area for storing management information of data can be sufficiently allocated, the size of the cluster may be the same as the size of the sector. In this case, data can be managed for each sector.

A plurality of pieces of cluster data is recorded in each page in a block. As described above, data in a cluster is sector data having continuous logical addresses. However, a plurality of pieces of cluster data in a block is not necessarily cluster data having continuous logical addresses. As described below, the mapping between logical addresses and recording positions in the memory system 1 is dynamically determined depending on a sequence of writing from the host device 150 and a sequence of transcription in the memory system 1.

Therefore, the address translation table 101A for managing the mapping between the logical addresses and the recording positions is provided. The address translation table 101A has functions for registering and invalidating a recording position corresponding to a logical address and searching the mapping. Also, the address translation table 101A has a function for, when the mapping is updated, notifying the valid data amount management unit 103 of a block identifier of a block (such as the sequential number of a block) corresponding to an updated recording position and a difference between the amounts of valid data in the block before and after the update.

Figure 6:
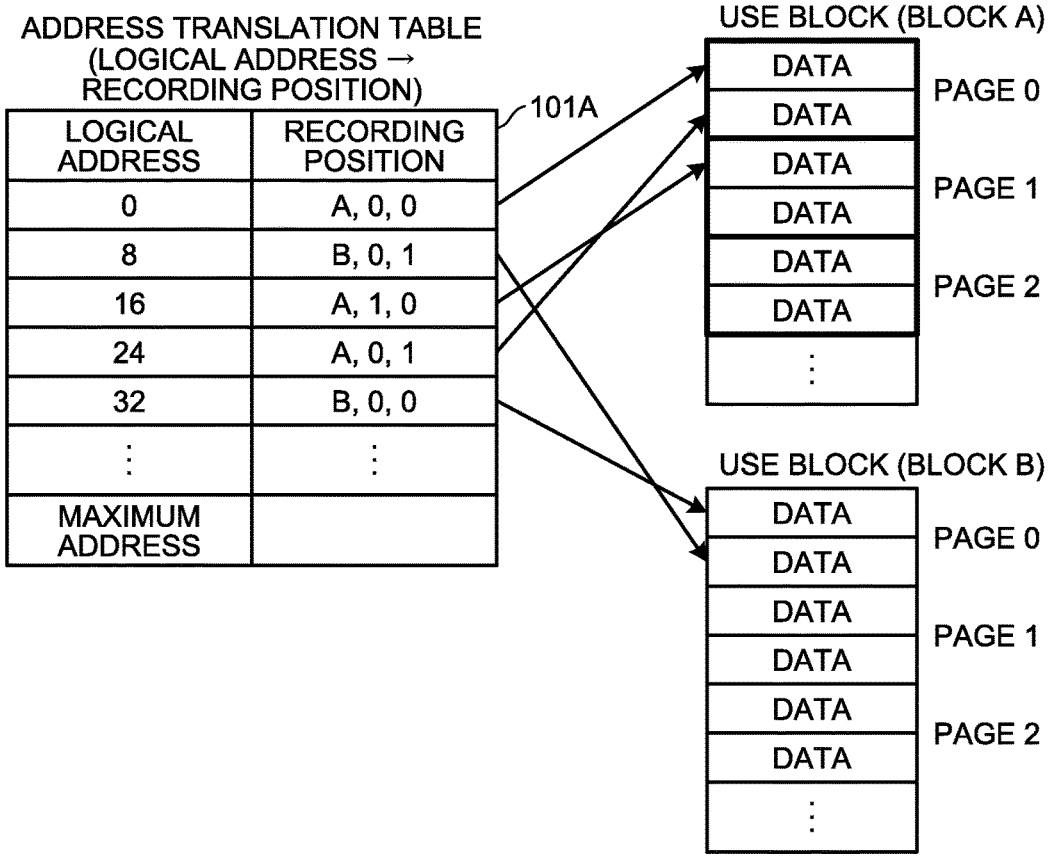
FIG. 6 is a data structure example of an address translation table of the embodiment.

Various data structures can be applied to the address translation table 101A that holds mapping information. FIG. 6 is an example of a simple data structure of the address translation table. The data structure shown in FIG. 6 is a structure in which the address translation table 101A that can store therein recording positions of all clusters in the logical capacity holds recording positions of each cluster in the order of logical addresses. For example, the table structure is prepared on a memory in advance. In the example shown in FIG. 6, the size of the clusters is 4 KB, the first logical address of each cluster data is a multiple of eight, and block identifier, page number, and offset position in page are held as a recording position.

Figure 7:
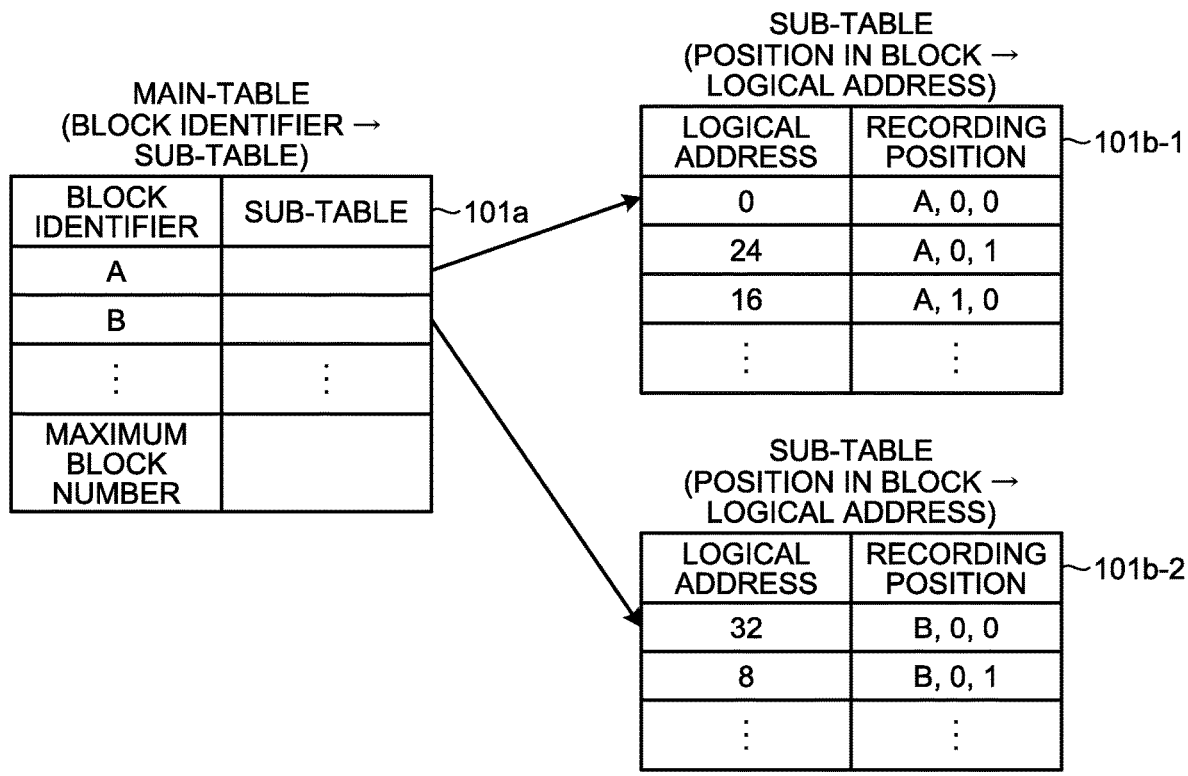
FIG. 7 is an example of a reverse table of the embodiment.

In the example of the data structure shown in FIG. 6, when searching for a logical address from a recording position, it is necessary to search for an entry corresponding to the recording position from all the entries in the address translation table 101A. Therefore, the cost is too much high. Therefore, the address translation table 101A may additionally hold a reverse table by which a logical address can be quickly searched from a recording position. FIG. 7 shows an example of the reverse table. In the example shown in FIG. 7, the reverse table includes sub-tables 101*b*-1, 101*b*-2, and so forth which record therein logical addresses corresponding to all the recording positions in each block and a main-table 101*a* having pointers to the sub-tables 101*b*-1, 101*b*-2, and so forth corresponding to each block.

Next, how the mapping in the address translation table 101A is updated when data is written or deleted according to a request from the host device 150 and data is transcribed in the memory system 1 will be described in detail with reference to the drawings. In this description, it is assumed that the logical address of the write data specified from the host device 150 is 16.

Figure 8:
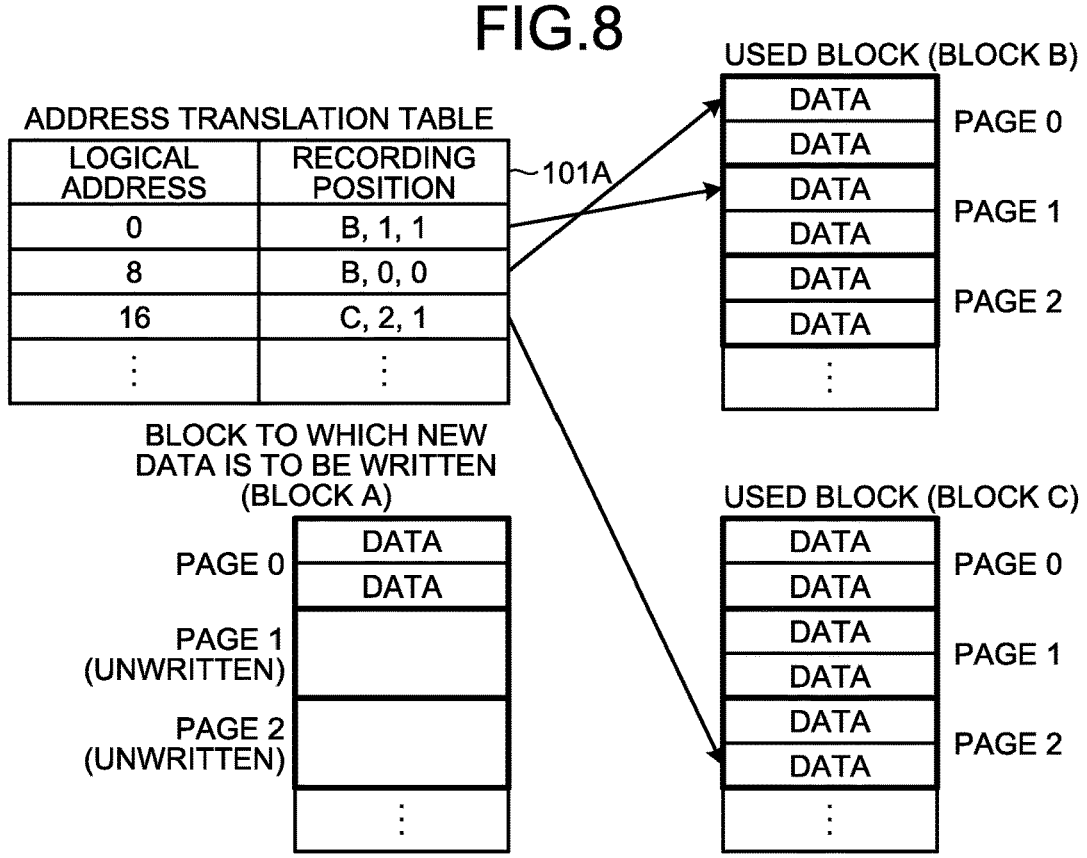
FIG. 8 is an illustration of a mapping update when data is written in the embodiment (before update)
Figure 9:
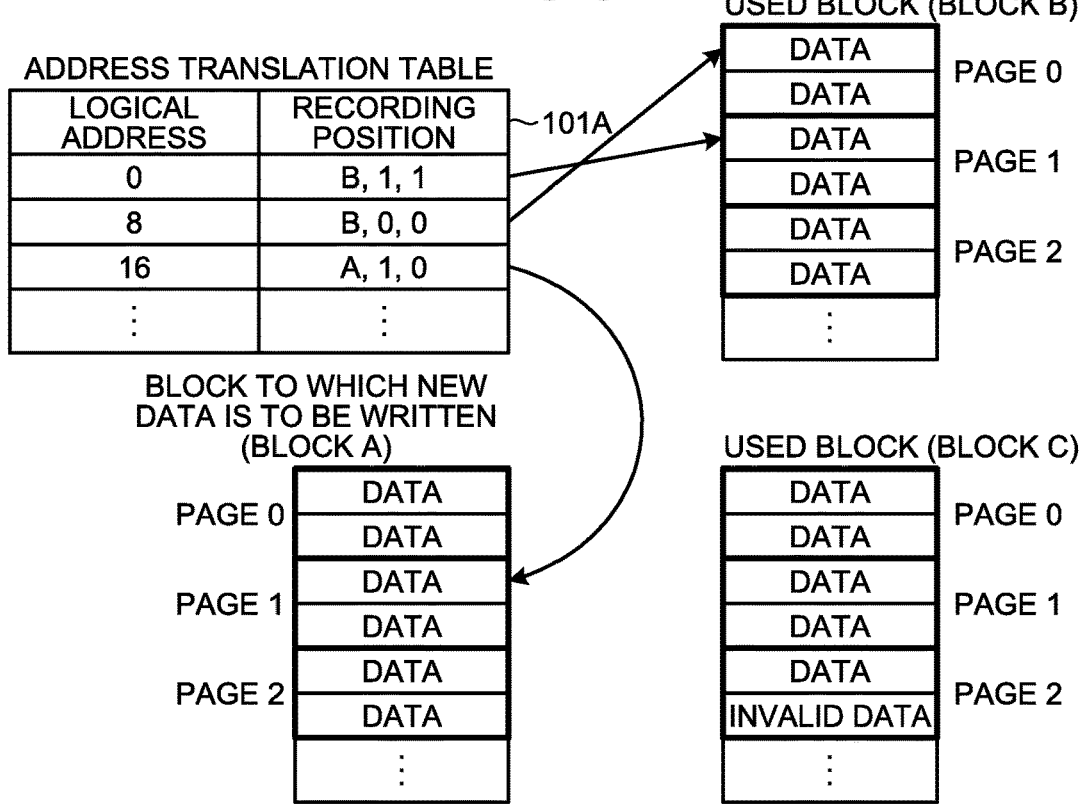
FIG. 9 is an illustration of a mapping update when data is written in the embodiment (after update)

FIGS. 8 and 9 are figures for explaining the update of the mapping when data is written. In the example shown in FIG. 8, block "C", page number "2", and offset position in page "1" are registered as a recording position corresponding to the logical address "16" in the address translation table 101A to which data has not yet been written. When a page size of data including data to be written to other logical addresses is transmitted from the host device 150 and accumulated in the buffer memory unit 120, the write command processing unit 105 writes the page size of data accumulated in the buffer memory unit 120 to an unwritten page "1" in a block "A" selected as a block to which new data is to be written.

After the data is written, as shown in FIG. 9, as a recording position corresponding to the logical address "16", block "A", page "1", and offset position in page "0" are registered in the address translation table 101A by the write command processing unit 105. Based on this, the mapping managed by the address translation table 101A is updated. As a result, data in the old recording position becomes invalid data, and data in the new recording position becomes valid data.

FIGS. 10 and 11 are figures for explaining the update of the mapping when data is deleted. In the update of the mapping when data is deleted, different from the update of the mapping when data is written, data is not written to a block and only invalidation of the recording position corresponding to the logical address is performed in the address translation table 101A. In the example shown in FIGS. 10 and 11, the deletion command processing unit 106 invalidates the mapping (see FIG. 11) by registering an invalid value (for example, a block identifier indicating no block) into the recording position of an entry corresponding to the logical address "16" in the address translation table 101A from which data has not yet been deleted (see FIG. 10). Based on this, data in the old recording position in the block "C" becomes invalid data.

Figure 12:
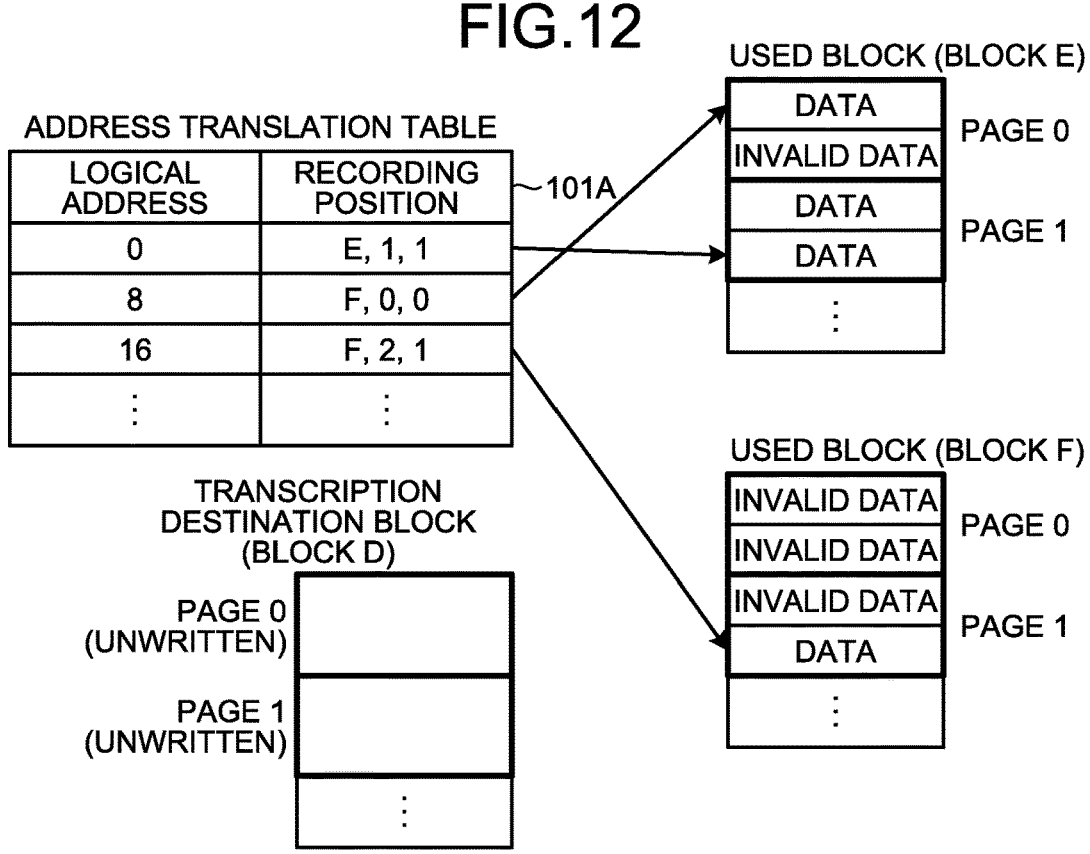
FIG. 12 is an illustration of a mapping update when data is transcribed in the embodiment (before transcription)
Figure 13:
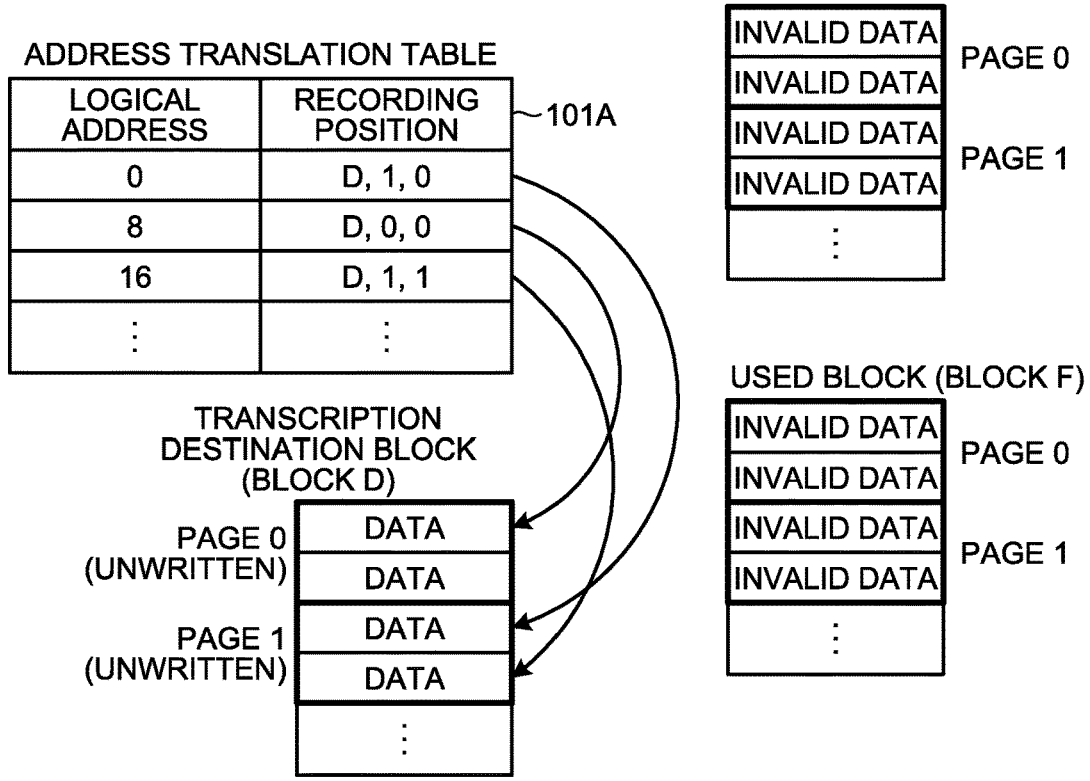
FIG. 13 is an illustration of a mapping update when data is transcribed in the embodiment (after transcription)

FIGS. 12 and 13 are figures for explaining the update of the mapping when data is transcribed in the SSD. The difference between the update of the mapping when data is written and the update of the mapping when data is transcribed is whether or not the data to be written/transcribed is recorded in the memory system 1.

In the example shown in FIG. 12, before transcribing data, valid data corresponding to the logical addresses "0", "8", and "16" are recorded in transcription source blocks "E" and "F". The block reduction processing unit 107 sequentially checks whether or not data in each recording position is valid data in ascending order from the first page in used blocks that are selected as the transcription source blocks by using the address translation table 101A. The block reduction processing unit 107 sequentially reads the checked valid data in the transcription source blocks "E" and "F" and outputs the read data to the buffer memory unit 120, and thereafter, when a page size of data is accumulated in the buffer memory unit 120, the block reduction processing unit 107 transcribes the valid data to be transcribed by recording the page size of data into a transcription destination block "D" in units of a page.

After the data is transcribed, as shown in FIG. 13, the block reduction processing unit 107 registers the recording positions corresponding to the logical addresses of the transcribed data into the address translation table 101A. In the example shown in FIGS. 12 and 13, the valid data corresponding to the logical addresses "0", "8", and "16" are transcribed to the transcription destination block "D", so that the positions in the block "D" are registered into the address translation table 101A as the recording positions of these logical addresses. As a result, data in the old recording positions in the transcription source blocks "E" and "F" are invalidated.

If the reverse table is held in the address translation table 101A as shown in FIG. 7, the reverse table is also updated when the mapping is updated as described above.

Next, block management according to the first embodiment will be described in detail with reference to FIG. 5. The blocks are classified into free blocks and used blocks. Since no valid data is recorded in a free block, it is possible to assign a free block as a block to which data is written when data is written next time. On the other hand, a used block has valid data. The used blocks are classified into the SLC blocks and the MLC blocks according to the operation mode thereof.

The block management unit 102 holds free block group management information 102*a* that is information indicating which blocks are free blocks (first management information), SLC block group management information 102*b* that is information indicating which blocks are SLC blocks (second management information), and MLC block group management information 102*c* that is information indicating which blocks are MLC blocks (third management information), in addition to block management information 102*d* that manages each block. The management information pieces (102*a* to 102*c*) of each block group include information of the blocks included in each block group and the number of the blocks.

The block management unit 102 may include a storage apparatus (first storage unit) for storing therein the free block group management information 102*a*, a storage apparatus (second storage unit) for storing therein the SLC block group management information 102*b*, and a storage apparatus (third storage unit) for storing the MLC block group management information 102*c*. Each of management information pieces may be stored in a single storage apparatus included in the block management unit 102, or the block management unit 102 may have a plurality of storage apparatuses and store each of management information pieces in a storage apparatus (storage unit) different from each other.

The block management unit 102 has functions to assign a free block, register a free block, register a used block, refer to the number of blocks in a block group, and refer to block information.

In accordance with the operation mode of a block specified to be registered, the function to register a used block adds information of the block to the SLC block group management information 102*b* or the MLC block group management information 102*c*, and adds one to the number of blocks of the block group.

The function to assign a free block refers to the free block group management information 102a, selects a block included in the free block group, and returns information of the selected free block to the write command processing unit 105 or the block reduction processing unit 107. Also, the function to assign a free block deletes the information of the selected free block from the free block group management information 102a, and subtracts one from the number of blocks of the free block group.

In accordance with the operation mode of a block specified to be registered, the function to register a free block deletes information of the block from the SLC block group management information 102b or the MLC block group management information 102c, and subtracts one from the number of blocks of the block group. Thereafter, the function to register a free block adds the information of the block to the free block group management information 102a, and adds one to the number of blocks of the block group. This function is used by the block reduction processing unit 107 when collecting, as a free block, a used block whose valid data becomes "0" by transcription of data.

Here, various forms can be considered as a data structure of the management information of each block group. However, in the first embodiment, as described above, the management information needs to have a data structure where the blocks can be managed even when all the blocks mounted in the memory system 1 are concentrated in one block group. The reason to have such a data structure is to make it possible to use all the blocks as the SLC blocks at the same time. Therefore, for example, one of such data structures having a simplest structure is a list structure connecting nodes that store therein a block identifier.

In the first embodiment, it is possible to use one physical block provided by a NAND flash memory as one block without change, or form one logical block by combining a plurality of physical blocks. For example, if a block capacity of one physical block (MLC mode) is 1 MB, the page size is 8 KB, and the number of pages is 128, when forming a logical block by collecting 32 physical blocks, the logical block can be handled as a block whose block capacity is 32 MB, page size is 256 KB, and number of pages is 128. In this case, a block identifier used in each function block is a block identifier of logical block.

One of the merits of combining a plurality of physical blocks and handling the combined physical blocks as one logical block is to reduce information of the blocks that should be managed by reducing the total number of blocks. For example, in an SSD having a total storage capacity of 128 GB, the number of physical blocks is 131072 (=128× 1024). On the other hand, the number of logical blocks in each of which 32 physical blocks are combined is 4096. When a logical block is formed by combining physical blocks, all of which can be accessed in parallel, the access speed of one logical block can be improved.

Next, the valid data amount management unit 103 according to the first embodiment will be described in detail with reference to the drawings. The valid data amount management unit 103 calculates the total amount of valid data of the blocks included in the SLC block group and the MLC block group. By using the update notification from the address translation table 101A as a trigger, the valid data amount management unit 103 searches for a block group to which a block whose mapping is updated belongs from the block management unit 102, and increases or decreases the amount of valid data of the block group by using difference information included in the update notification. Here, the valid data amount management unit 103 may hold information of the amount of valid data for each block. In the same manner as for the amount of valid data for each block group, the amount of valid data for each block is increased or decreased by using difference information of valid data of the block.

The valid data amount management unit 103 may not be an independent function unit. For example, the function of the valid data amount management unit 103 can be included in the address translation table 101A. Specifically, when the address translation table 101A includes the reverse table as shown in FIG. 7, the amount of valid data of each block may be registered in each sub-table 101b-1, 102b-2, and so forth. Or alternatively, the function of the valid data amount management unit 103 can be included in the block management unit 102. In this case, information related to the amount of valid data of each block and each block group is registered in the block management unit 102.

Figure 14:
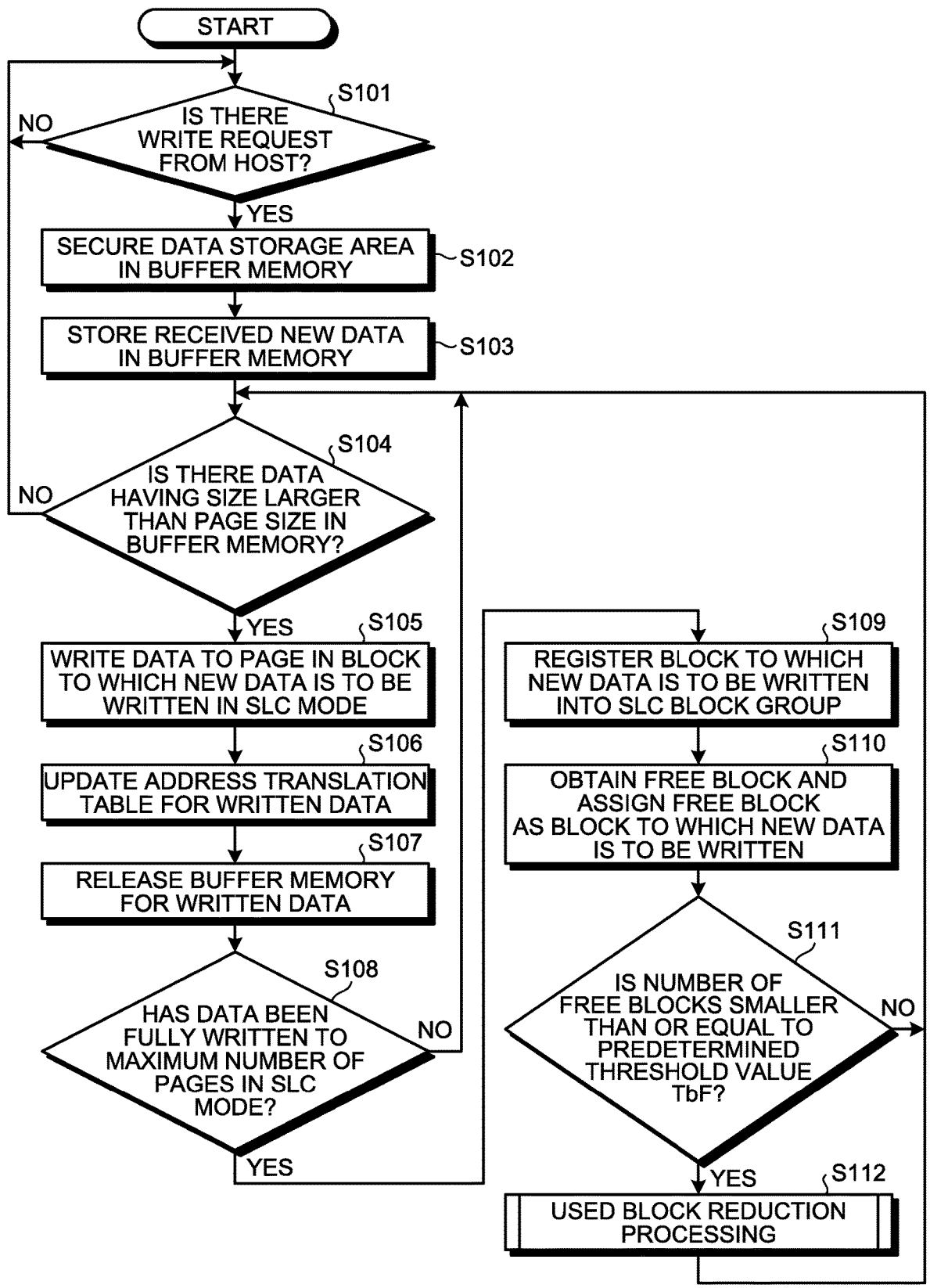
FIG. 14 is a schematic flowchart when a data write request is received in the embodiment.

Next, an operation of the memory system 1 according to the first embodiment will be described in detail with reference to the drawings. FIG. 14 is a flowchart showing a schematic operation when a data write request is issued from the host device 150. In the operation shown in FIG. 14, it is assumed that a block to which new data is to be written has been assigned as an initial state.

As shown in FIG. 14, first, the write command processing unit 105 waits for an input of a write command of new data to the interface unit 130 from the host device 150 (NO in step S101). When receiving the write command (YES in step S101), the write command processing unit 105 allocates a data storage area in the buffer memory unit 120 (step S102), and then stores the new data transmitted from the host device 150 in the data storage area allocated in the buffer memory unit 120 (step S103).

Next, the write command processing unit 105 checks the amount of unwritten new data stored in the buffer memory unit 120 (step S104), and when the amount of data is smaller than the page size (NO in step S104), the write command processing unit 105 returns to step S101 and waits for the next write command. On the other hand, when the amount of data is greater than or equal to the page size (YES in step S104), the write command processing unit 105 selects data corresponding to the page size from the unwritten data in the buffer memory unit 120, and writes the selected data in the SLC mode to a page in the block to which new data is to be written and which has been assigned in the non-volatile memory unit 110 (step S105).

Next, the write command processing unit 105 updates the mapping by registering the logical address and the recording position (block identifier, page number, and offset in page) of the written data into the address translation table 101A (step S106). At this time, a change of the amount of valid data is notified from the address translation table 101A to the valid data amount management unit 103. Thereafter, the write command processing unit 105 releases the area in which the written data has been stored in the buffer memory unit 120 (step S107).

Next, the write command processing unit 105 determines whether or not there is a page in which no data is written, in other words, an unwritten page, in the block to which new data is to be written (step S108). The operation mode of the block to which new data is to be written is the SLC mode. When there is an unwritten page (NO in step S108), the write command processing unit 105 returns to step S104 and checks the amount of unwritten data remaining in the buffer memory unit 120. On the other hand, when there is no unwritten page (YES in step S108), in other words, when data has been fully written to the maximum number of pages in the block to which new data is to be written, the write command processing unit 105 registers the block to which new data has been written into the SLC block group management information 102b of the block management unit 102 (step S109). Next, the write command processing unit 105 obtains one free block managed in the free block group management information 102a of the block management unit 102, and assigns the free block as the next block to which new data is to be written (step S110).

Next, the write command processing unit 105 refers to the number of blocks in the free block group in the free block group management information 102a of the block management unit 102, and determines whether or not the number of free blocks is smaller than or equal to a predetermined threshold value Tbf (step S111). When the number of free blocks is greater than the predetermined threshold value Tbf (NO in step S111), the write command processing unit 105 returns to step S104. On the other hand, when the number of free blocks is smaller than or equal to the predetermined threshold value Tbf (YES in step S111), the write command processing unit 105 issues a request to reduce the number of used blocks to the block reduction processing unit 107 and performs the used block reduction processing (step S112). Thereafter, the write command processing unit 105 returns to step S104.

Here, the predetermined threshold value Tbf needs to be greater than or equal to the number of blocks allocated at one time by the block reduction processing unit 107 as the transcription destination blocks. At least one block is required as the transcription destination block, so that the predetermined threshold value Tbf needs to be greater than or equal to one.

In FIG. 14, the processing from step S101 to step S103 can be performed in parallel with the processing of step S104 and the following steps. However, if it takes a relatively long time to perform the processing of step S105 and the following steps in which data is written to a page, at step S102 in which the data storage area is allocated in the buffer memory unit 120, a sufficient size of area may not have been released. Therefore, when performing the processing from step S101 to step S103 and the processing of step S104 and the following steps in parallel, it is desired to provide a step for waiting until a sufficient size of area is released in the buffer memory unit 120.

In the processing of step S104 and the following steps, it is possible to perform in parallel the processing from step S104 to step S110 which performs the new data write processing and the processing from step S111 to step S112 which performs the used block reduction processing. However, if there are page read operations or page write operations which cannot perform data access to the non-volatile memory unit in parallel, these operations need to be performed sequentially in an appropriate manner.

Here, the used block reduction processing shown in step S112 in FIG. 14 will be described. In the used block reduction processing, the number of used blocks is reduced and the number of free blocks is increased by collecting valid data scattered in some used blocks and transcribing the valid data to other blocks. For example, when there are M transcription source blocks and the amount of valid data stored in the M transcription source blocks can be stored in N transcription destination blocks, it is possible to reduce the number of used blocks by (M−N). In this case, in the first embodiment, used blocks in the same operation mode (SLC mode or MLC mode) are selected as the transcription source blocks. Data is transcribed to the transcription destination blocks in the MLC mode.

Figure 15:
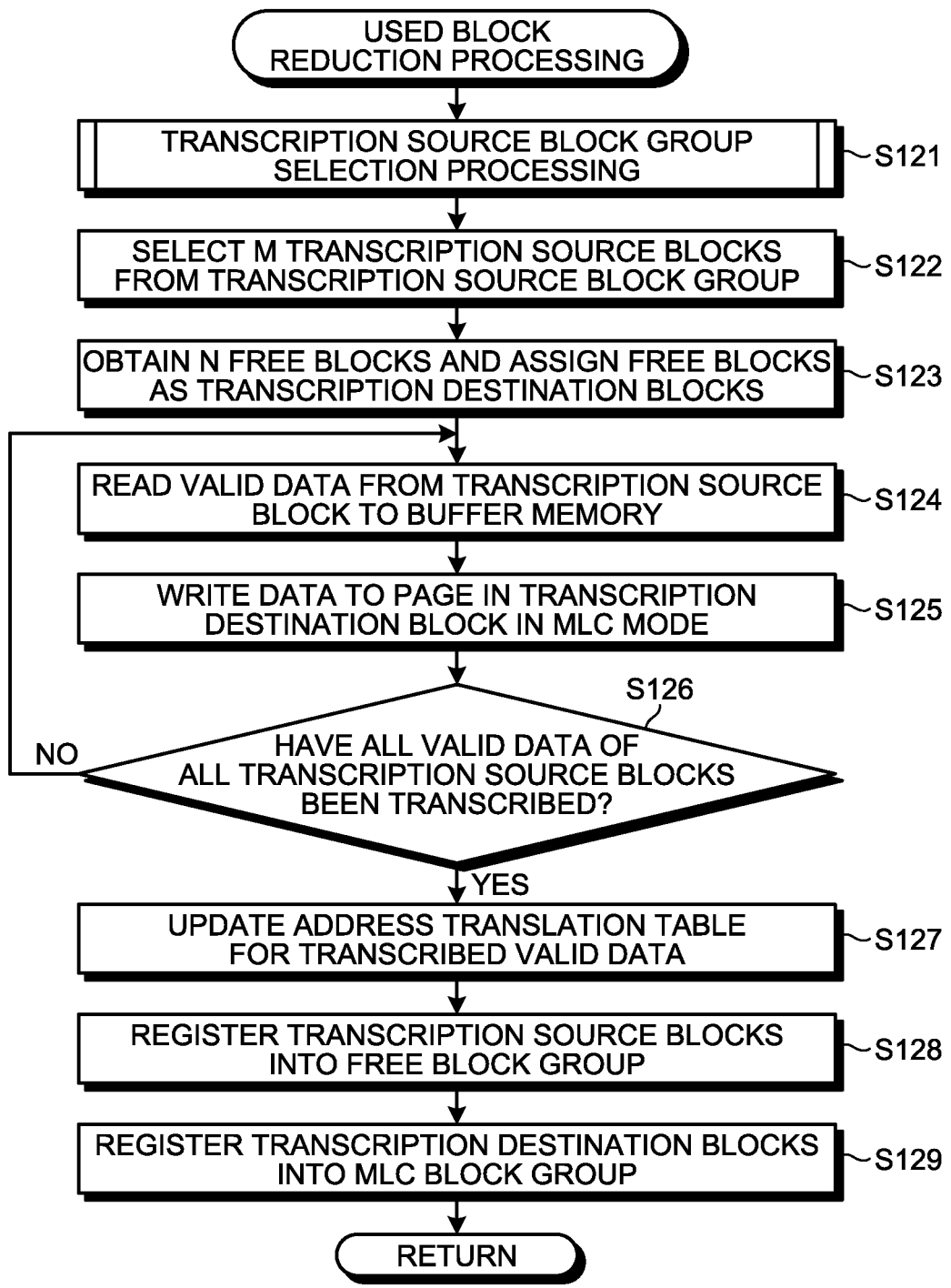
FIG. 15 is a schematic flowchart (1) of the used block reduction processing in the embodiment.
Figure 16A:
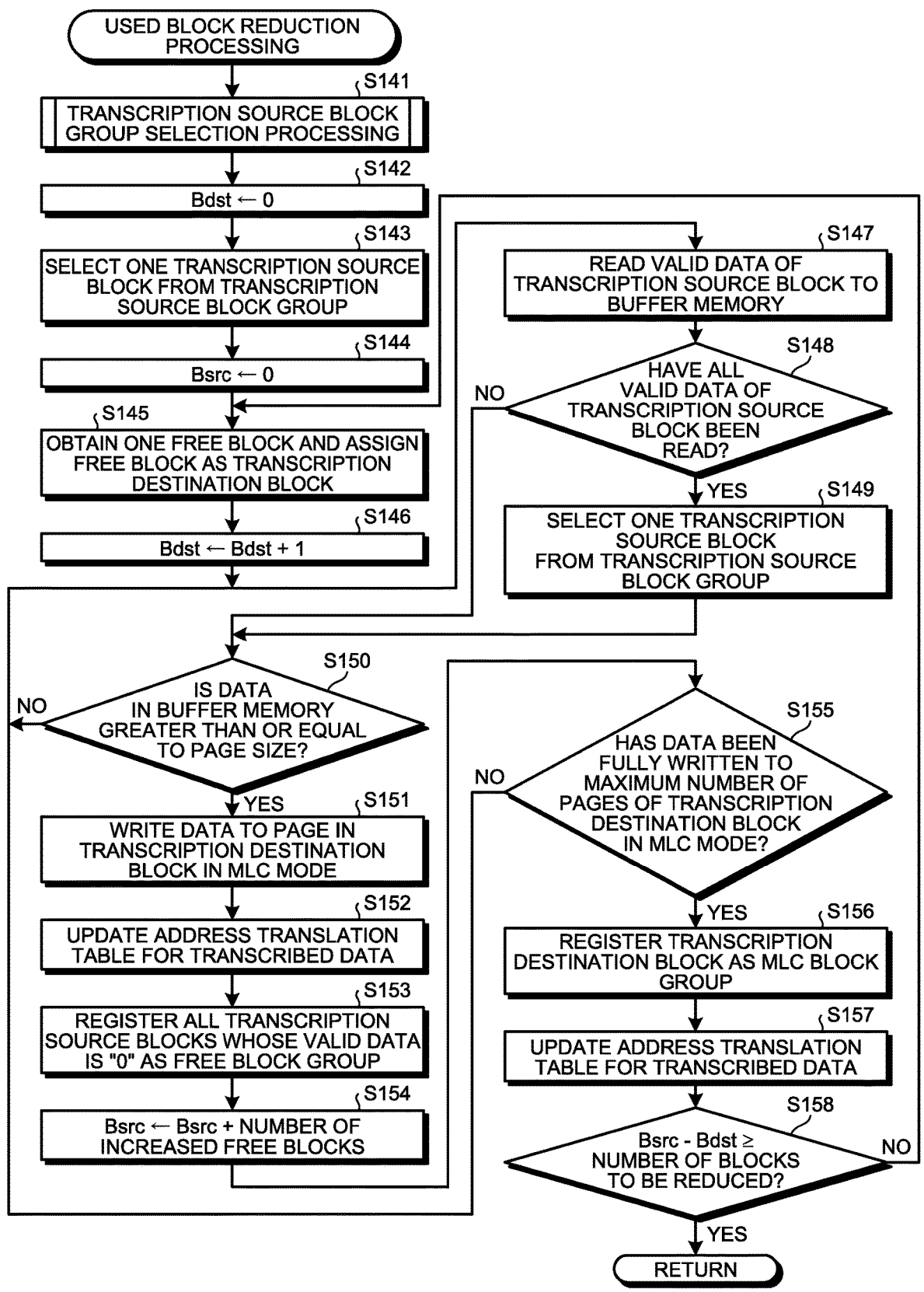
FIG. 16A is a schematic flowchart (2) of the used block reduction processing in the embodiment.
Figure 16B:
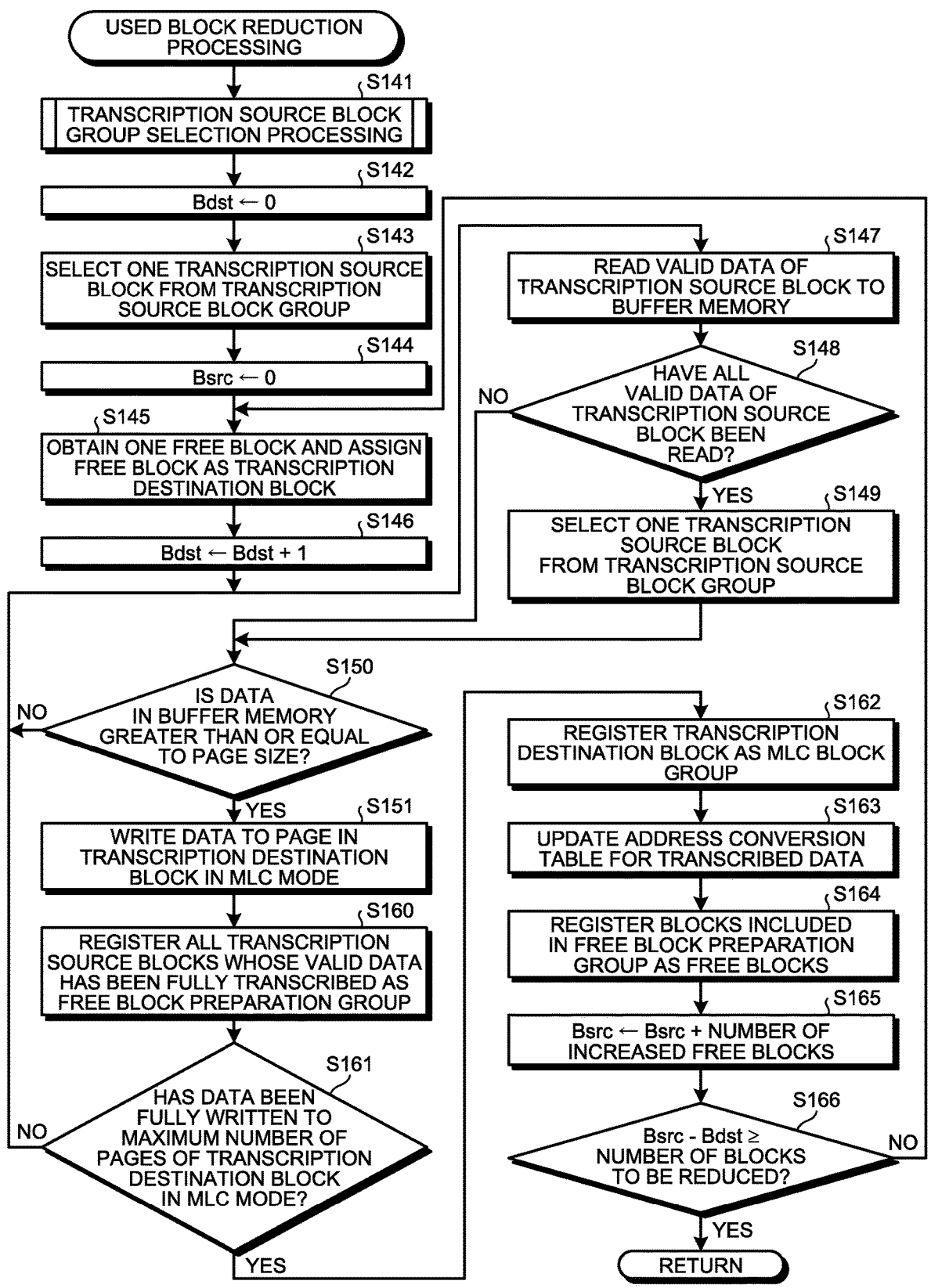
FIG. 16B is a schematic flowchart (3) of the used block reduction processing in the embodiment.

Hereinafter, two examples of the used block reduction processing will be described. FIG. 15 is an example of collectively setting a plurality of transcription source blocks and a plurality of transcription destination blocks. FIG. 16A is an example of setting one transcription source block and one transcription destination block. FIG. 16B is a modified example of FIG. 16A.

As shown in FIG. 15, when the block reduction processing unit 107 receives a request to reduce the number of used blocks from the write command processing unit 105, first, the block reduction processing unit 107 causes the transcription source block group selection unit 108 to perform the transcription source block group selection processing for selecting a block group to be the transcription source, in other words, the block group from which blocks are reduced, among the SLC block group and the MLC block group managed by the block management unit 102 (step S121). Subsequently, the block reduction processing unit 107 causes the transcription source block selection unit 109 to perform processing for selecting M (>=1) used blocks to be transcription source in the selected block group as the transcription source blocks (step S122). Here, for example, if the MLC block group is selected as the transcription source block group, and the total rate of valid data of the MLC block group is V, it is possible to select M transcription source blocks whose valid data can be stored in M×V transcription destination blocks. In this case, by selecting an integer M satisfying M>=1/(1−V), the valid data is transcribed to N MLC blocks wherein N is an integer smaller than or equal to M−1.

Subsequently, the block reduction processing unit 107 calculates the number of blocks N necessary to store valid data of the selected M transcription source blocks to the MLC blocks, and obtains N free blocks from the free block group managed in the free block group management information 102a of the block management unit 102, and assigns the free blocks as the transcription destination blocks (step S123). The number of blocks N can be calculated by, for example, obtaining the amount of valid data of each of the selected M transcription source blocks from the valid data amount management unit 103, calculating the total amount of valid data D of all the transcription source blocks by summing up the obtained amounts of valid data, dividing the obtained total amount of valid data D by the block capacity Sm of the MLC block, and rounding up the obtained value to an integer.

Next, the block reduction processing unit 107 allocates a data storage area corresponding to at least one page in the buffer memory unit 120, and then reads valid data, which corresponds to one page, stored in the selected M transcription source blocks and outputs the read valid data to the data storage area allocated in the buffer memory unit 120 (step S124). Subsequently, the block reduction processing unit 107 writes the valid data read to the buffer memory unit 120 to a page of the free blocks selected as the transcription destination blocks in the MLC mode (step S125).

Next, the block reduction processing unit 107 determines whether or not valid data of all the M transcription source blocks has been transcribed (step S126), and when all the valid data has not been transcribed (NO in step S126), the block reduction processing unit 107 returns to step S124 and transcribes the remaining valid data page by page. On the other hand, when all the valid data has been transcribed (YES in step S126), the block reduction processing unit 107 updates the mapping of the transcribed valid data by registering recording positions of the transcription destination corresponding to logical addresses into the address translation table 101A (step S127). Based on this, all the valid data in the selected M transcription source blocks become invalid data. Subsequently, the block reduction processing unit 107 registers the transcription source blocks from which data has been transcribed into the free block group management information 102a of the block management unit 102 (step S128), registers the transcription destination blocks in which valid data is newly stored into the MLC block group management information 102c of the block management unit 102 (step S129), and returns to the operation shown in FIG. 14. In this way, the transcription source blocks from which data has been transcribed are collected as free blocks. As a result, the number of used blocks is reduced by (M–N).

On the other hand, when setting one transcription source block and one transcription destination block, the process flow is as shown in FIG. 16A. When the block reduction processing unit 107 receives a request to reduce the number of used blocks from the write command processing unit 105, first, the block reduction processing unit 107 causes the transcription source block group selection unit 108 to perform the same transcription source block group selection processing as that in step S121 in FIG. 15 (step S141), and then, sets "0" to the total number Bdst of transcription destination blocks (step S142). Next, the block reduction processing unit 107 causes the transcription source block selection unit 109 to select one used block as the transcription source block from a block group selected as the transcription source (step S143), and sets "0" to the total number Bsrc of transcription source blocks from which valid data has been transcribed (step S144).

Next, the block reduction processing unit 107 obtains one free block from the free block group managed in the free block group management information 102a of the block management unit 102, assigns the free block as the transcription destination block (step S145), and increments by one the total number Bdst of transcription destination blocks (step S146). It is assumed that at least one page of data storage area used by the block reduction processing unit 107 is allocated in the buffer memory unit 120.

Next, the block reduction processing unit 107 reads valid data stored in the transcription source block being selected and outputs the read valid data to the data storage area allocated in the buffer memory unit 120 (step S147). Next, the block reduction processing unit 107 determines whether or not all the valid data in the transcription source block being selected has been read to the buffer memory unit 120 (step S148), and if all the valid data has not been read (NO in step S148), the block reduction processing unit 107 proceeds to step S150.

As a determination result of step S148, if all the valid data in the transcription source block has been read (YES in step S148), in the same manner as in step S143, the block reduction processing unit 107 causes the transcription source block selection unit 109 to select one used block as the transcription source block from a block group selected as the transcription source (step S149), and proceeds to step S150. It is desired that, when selecting new transcription source block in step S149, the transcription source block that was selected just before this selection is not selected again.

Next, the block reduction processing unit 107 determines whether or not the data read to the buffer memory unit 120 becomes greater than or equal to the page size (step S150), and if the data is not greater than or equal to the page size (NO in step S150), the block reduction processing unit 107 returns to step S147. On the other hand, if the data is greater than or equal to the page size (YES in step S150), the block reduction processing unit 107 writes the valid data read to the buffer memory unit 120 to a page of the free block selected as the transcription destination block in the MLC mode (step S151).

Next, the block reduction processing unit 107 updates the mapping of the transcribed valid data by registering the recording position of the transcription destination corresponding to the logical address of the transcribed valid data into the address translation table 101A (step S152).

Next, the block reduction processing unit 107 registers, as the free block group, all transcription source blocks whose amount of valid data becomes 0 among the transcription source blocks from which the valid data is transcribed in step S151 (step S153). Subsequently, the block reduction processing unit 107 adds the number of transcription source blocks which become free blocks in step S153 (the number of increased free blocks) to the total number Bsrc of transcription source blocks from which valid data has been transcribed (step S154).

Next, the block reduction processing unit 107 determines whether or not data has been fully written to the maximum number of pages of the MLC mode in the transcription destination block (step S155), and when the data has not been fully written to the maximum number of pages (NO in step S155), the block reduction processing unit 107 returns to step S147.

As a result of the determination in step S155, when the data has been fully written to the maximum number of pages of the MLC mode in the transcription destination block (YES in step S155), the block reduction processing unit 107 registers the transcription destination block into the MLC block group management information 102c of the block management unit 102 (step S156). Subsequently, the block reduction processing unit 107 determines whether or not the number of reduced blocks is greater than or equal to the predetermined number of reduced blocks, in other words, whether or not a value obtained by subtracting the total number Bdst of transcription destination blocks from the total number Bsrc of transcription source blocks from which data has been transcribed is greater than or equal to the predetermined number of reduced blocks (step S157), and when the number of reduced blocks is not greater than or equal to the predetermined number of reduced blocks (NO in step S157), the block reduction processing unit 107 returns to step S145. On the other hand, when the number of reduced blocks is greater than or equal to the predetermined number of reduced blocks (YES in step S157), the block reduction processing unit 107 returns to the operation shown in FIG. 14. In the manner as described above, it is also possible to reduce the intended number of used blocks.

In case that data in a transcription destination block cannot be read due to some sort of problem during transcription, it is possible to save the state before the transcription so that the valid data and the address translation table can be rolled back. FIG. 16B is a modified example of FIG. 16A. In FIG. 16B, the transcription source blocks from which valid data has been copied are not collected immediately as free blocks, and the transcription source blocks are temporarily protected as a free block preparation group until data corresponding to the block capacity has been transcribed to the transcription destination block. When data has been transcribed to the transcription destination block, it is not necessary to save the state before the transcription. Thus, after the address translation table is updated with respect to the data that has been transcribed, the transcription source blocks from which data has been transcribed are collectively collected as free blocks from the free block preparation group.

Steps from S141 to S151 in FIG. 16B are the same as those in FIG. 16A. Hereinafter, step S160 and the following steps will be described.

The block reduction processing unit 107 registers, as the free block preparation group, all transcription source blocks whose valid data has been completely copied among the transcription source blocks from which the valid data is transcribed in step S151 (step S160).

Next, the block reduction processing unit 107 determines whether or not data has been fully written to the maximum number of pages of the MLC mode in the transcription destination block (step S161), and when the data has not been fully written to the maximum number of pages (NO in step S161), the block reduction processing unit 107 returns to step S147.

As a result of the determination in step S161, when the data has been fully written to the maximum number of pages of the MLC mode in the transcription destination block (YES in step S161), the block reduction processing unit 107 registers the transcription destination block into the MLC block group management information 102c of the block management unit 102 (step S162).

Next, the block reduction processing unit 107 updates the mapping of the valid data transcribed to the transcription destination block by registering the recording position of the transcription destination corresponding to the logical address of the valid data transcribed to the transcription destination block into the address translation table 101A (step S163). Then, the block reduction processing unit 107 registers the blocks included in the free block preparation group as the free block group (step S164). Subsequently, the block reduction processing unit 107 adds the number of transcription source blocks which become free blocks in step S164 to the total number Bsrc of transcription source blocks from which valid data has been transcribed (step S165).

Next, the block reduction processing unit 107 proceeds to step S166, and in the same manner as in step S157 in FIG. 16A, when the number of reduced blocks is not greater than or equal to the predetermined number of reduced blocks (NO in step S166), the block reduction processing unit 107 returns to step S145. On the other hand, when the number of reduced blocks is greater than or equal to the predetermined number of reduced blocks (YES in step S166), the block reduction processing unit 107 returns to the operation shown in FIG. 14.

If, as shown in FIG. 16A, the transcription source block is registered as a free block and the free block is reused and erased before the transcription destination block is filled with data, if, thereafter, a problem occurs in the transcription destination block and data cannot be read from the transcription destination block, the data is lost. On the other hand, according to the flow of the processing in FIG. 16B, until the transcription destination block is filled with data, the same data is present in both the transcription source block and the transcription destination block. Based on this, even if a problem occurs during transcription and data cannot be read from the transcription destination block, the original data remains in the transcription source block, so that the data is not lost. In this way, in the processing flow shown in FIG. 16B, fault tolerance can be improved.

Next, the transcription source block group selection processing shown in step S121 in FIG. 15 and step S141 in FIGS. 16A and 16B will be described. Some methods can be considered for the transcription source block group selection processing. Hereinafter, three of those methods will be described as examples.

Figure 17:
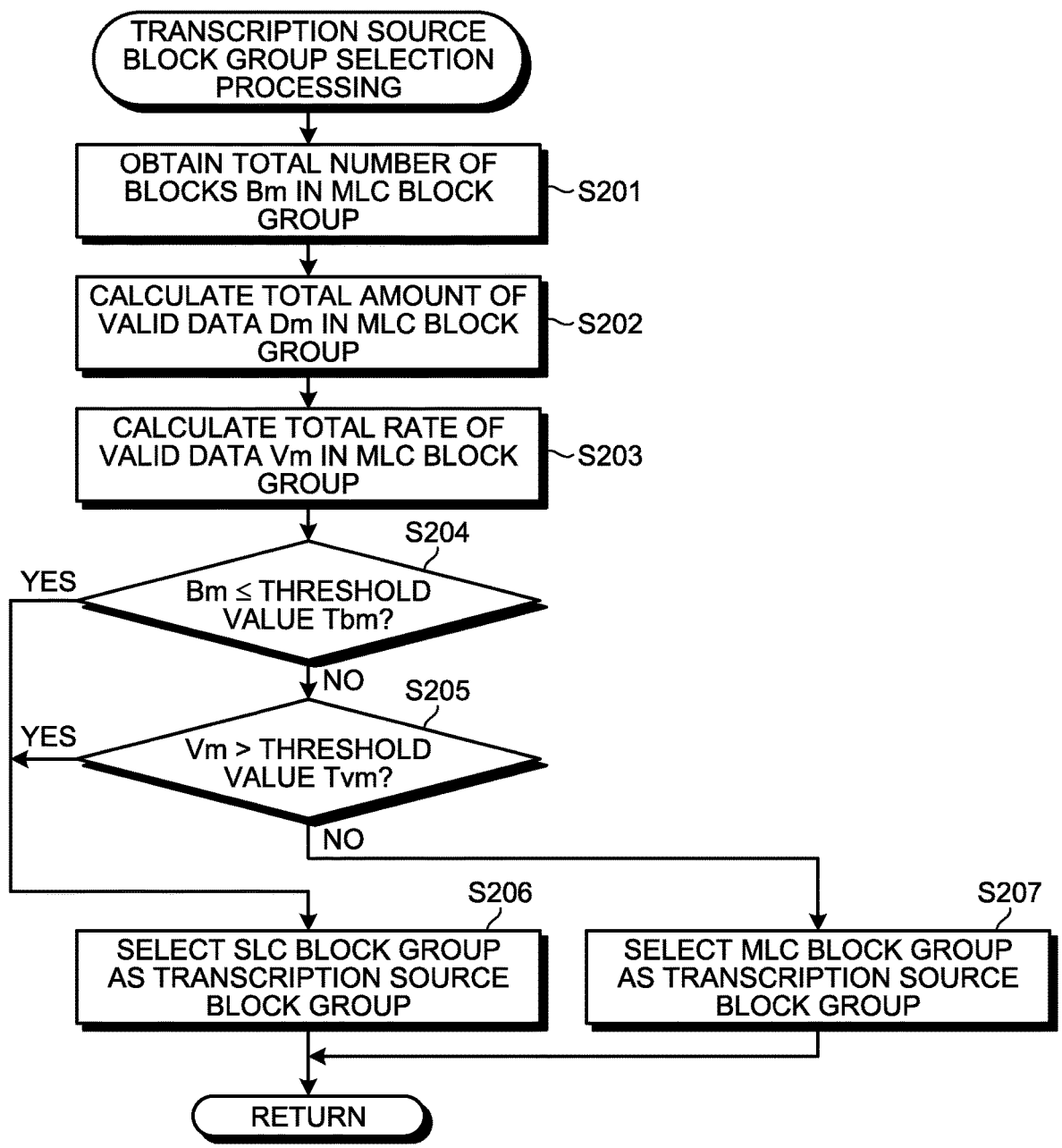
FIG. 17 is a schematic flowchart (1) of transcription source block group selection processing in the embodiment.
Figure 18:
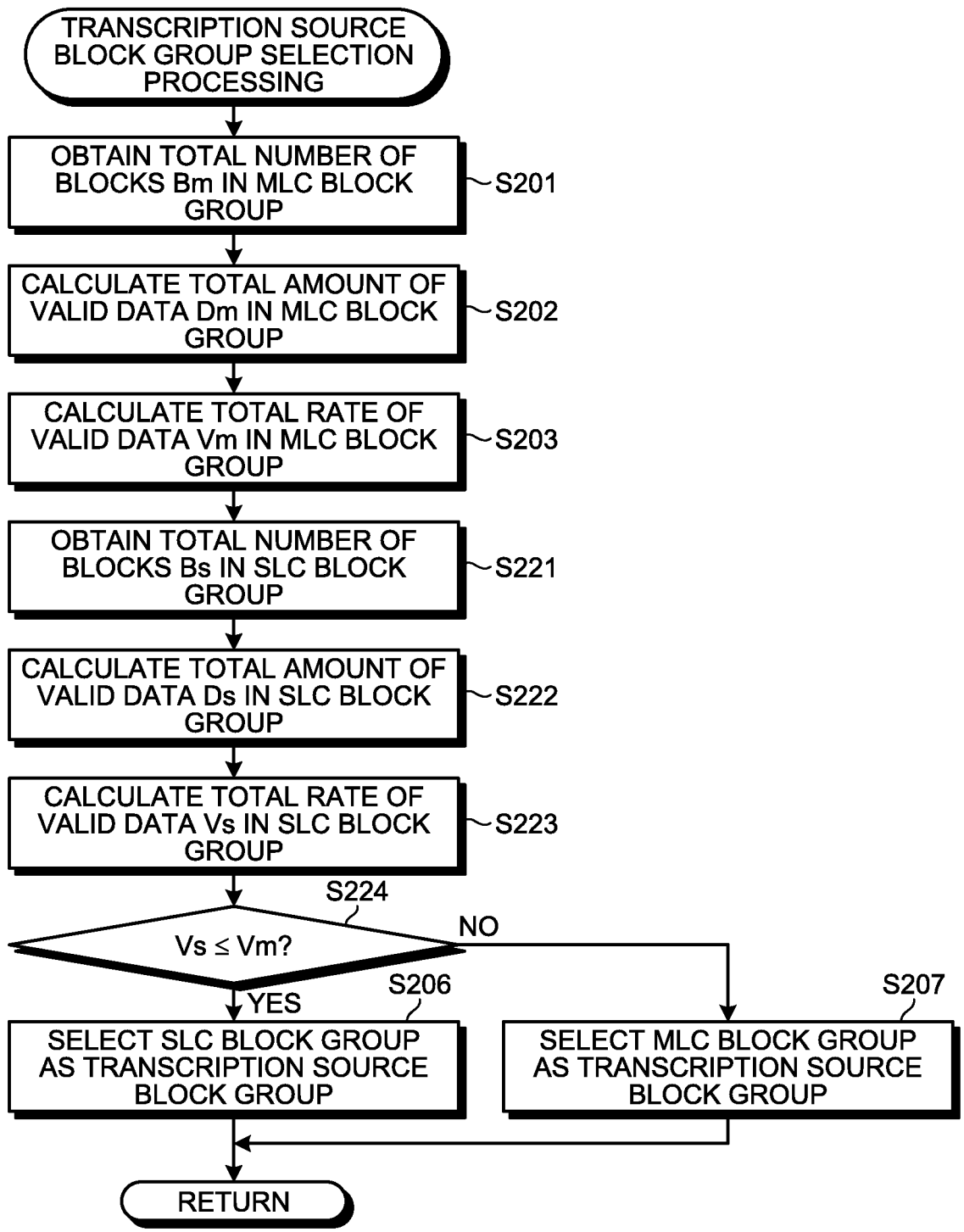
FIG. 18 is a schematic flowchart (2) of transcription source block group selection processing in the embodiment.
Figure 19:
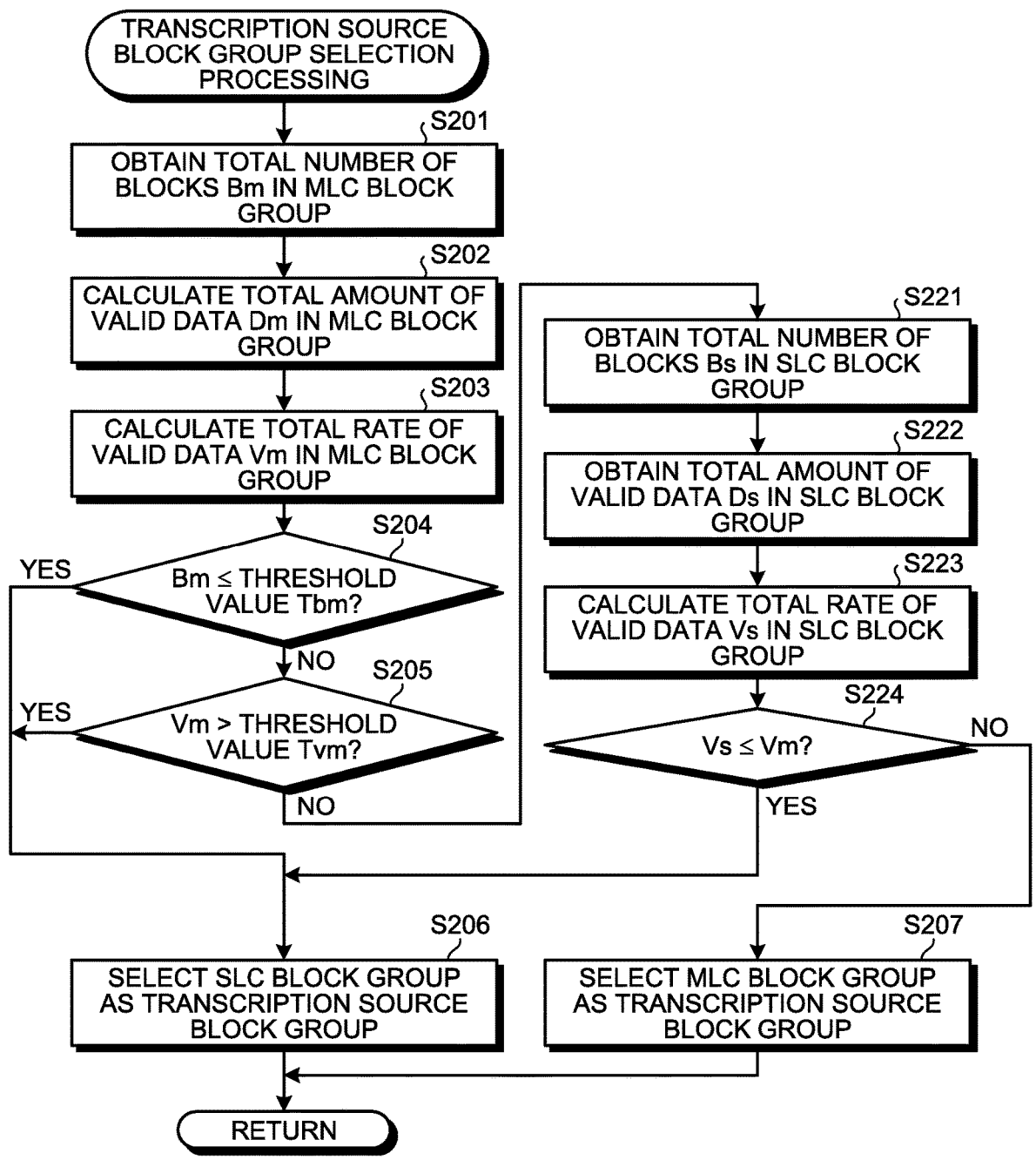
FIG. 19 is a schematic flowchart (3) of transcription source block group selection processing in the embodiment.

FIG. 17 is an example in which the MLC block group is preferentially selected as the transcription source block group when the rate of valid data of the MLC block group is lower than a predetermined threshold value. FIG. 18 is an example in which a block group having the lower rate of valid data is selected from the SLC block group and the MLC block group as the transcription source block group. FIG. 19 is an example in which limitations of the number of blocks Bm and the rate of valid data Vm of the MLC block group shown in FIG. 17 are added to the example shown in FIG. 18.

As shown in FIG. 17, the transcription source block group selection unit 108 obtains the total number of blocks Bm in the MLC block group by referring to the MLC block group management information 102c of the block management unit 102 (step S201), obtains the amount of valid data in each MLC block belonging to the MLC block group from the valid data amount management unit 103, and calculates the total amount of valid data Dm in all the MLC blocks by summing up the obtained amounts of valid data (step S202), and subsequently as shown by the formula 1 below, the transcription source block group selection unit 108 calculates the total rate of valid data Vm of the MLC block group by dividing the total amount of valid data Dm obtained in step S202 by a value obtained by multiplying the total number of blocks Bm obtained in step S201 by the capacity of one MLC block Sm (step S203).

$$Vm = Dm/(Bm * Sm) \qquad (1)$$

Next, the transcription source block group selection unit 108 determines whether or not the total number of blocks Bm in the MLC block group is smaller than or equal to a predetermined threshold value Tbm (step S204), and if the total number of blocks Bm is greater than the threshold value Tbm (NO in step S204), the transcription source block group selection unit 108 subsequently determines whether or not the total rate of valid data Vm of the MLC block group is greater than a predetermined threshold value Tvm (step S205).

When the total number of blocks Bm is smaller than or equal to the threshold value Tbm (YES in step S204), or when the total rate of valid data Vm is greater than the threshold value Tvm (YES in step S205), the transcription source block group selection unit 108 selects the SLC block group as the transcription source block group (step S206). On the other hand, when the total number of blocks Bm is greater than the threshold value Tbm and when the total rate of valid data Vm is smaller than or equal to the threshold value Tvm (NO in step S204 and NO in step S205), the transcription source block group selection unit 108 selects the MLC block group as the transcription source block group (step S207). When selecting the transcription source block group in this way, the transcription source block group selection unit 108 returns to the operation shown in FIG. 15, 16A, or 16B, and returns the processing to the block reduction processing unit 107.

For example, the threshold value Tvm is desired to be a value that makes transcription efficiency not worse than that in a case in which all the blocks are MLC blocks. The transcription efficiency is worst when the logical capacity of valid data provided to the host is fully recorded, and the valid data is evenly distributed and stored in all the blocks. In this case, when the total storage capacity is represented by Sall, and the logical capacity is represented by Smax, the rate of valid data V of each block is represented by V=Smax/Sall. Here, when the transcription is performed, by transcribing M transcription source blocks (M=1/(1−V)) to N transcription destination blocks (N=M−1), the number of used blocks can be reduced by one. Therefore, when the threshold value Tvm=V, if the total rate of valid data Vm of the MLC block group is smaller than or equal to the threshold value Tvm, it is possible to reduce the number of used blocks by one when at least M transcription source blocks are transcribed, so that the transcription efficiency is not worse than the worst case described above.

As described above, according to the transcription source block group selection unit 108 shown in FIG. 17, the number of blocks in the MLC block group can be reduced in a range in which the transcription efficiency is not worse than a value determined by the threshold value Tvm, so that the reduced number of blocks can be assigned as the SLC blocks.

When a block group having the lower rate of valid data is selected from the SLC block group and the MLC block group as the transcription source block group, as shown in FIG. 18, in the same manner as in steps S201 to S203 in FIG. 17, the transcription source block group selection unit 108 calculates the total rate of valid data Vm.

Also, the transcription source block group selection unit 108 obtains the total number of blocks Bs in the SLC block group by referring to the SLC block group management information 102b of the block management unit 102 (step S221), obtains the amount of valid data in each SLC block belonging to the SLC block group from the valid data amount management unit 103, and calculates the total amount of valid data Ds in all the SLC blocks by summing up the obtained amounts of valid data (step S222), and subsequently as shown by the formula 2 below, the transcription source block group selection unit 108 calculates the total rate of valid data Vs of the SLC block group by dividing the total amount of valid data Ds obtained in step S222 by a value obtained by multiplying the total number of blocks Bs obtained in step S221 by the capacity of one SLC block Ss (step S223). Here, when the SLC mode is two-value mode and the MLC mode is four-value mode, the capacity of SLC block Ss is ½ of the capacity of MLC block Sm.

$$Vs=Ds/(Bs*Ss) \quad (2)$$

Next, the transcription source block group selection unit 108 compares the total rate of valid data Vm of the MLC block group calculated in step S203 and the total rate of valid data Vs of the SLC block group calculated in step S223 (step S224), and when the total rate of valid data Vs of the SLC block group is smaller than or equal to the total rate of valid data Vm of the MLC block group (YES in step S224), the transcription source block group selection unit 108 selects the SLC block group as the transcription source block group (step S206). On the other hand, when the total rate of valid data Vs is greater than the total rate of valid data Vm (NO in step S224), the transcription source block group selection unit 108 selects the MLC block group as the transcription source block group (step S207). When selecting the transcription source block group in this way, the transcription source block group selection unit 108 returns to the operation shown in FIG. 15, 16A, or 16B, and returns the processing to the block reduction processing unit 107.

As described above, according to the processing flow of the transcription source block group selection unit 108, a block group having the lower rate of valid data is selected from the SLC block group and the MLC block group as the transcription source block group. Thus, compared with the processing flow shown in FIG. 17, although the amount of calculation of the total rate of valid data increases, the transcription efficiency can be improved.

When calculating the total rate of valid data of the SLC block group and the MLC block group by simply assuming that the capacity of SLC block is the same as the capacity of MLC block, the SLC block group, which can originally store therein only a half of valid data that can be stored in the MLC block group, tends to be selected. On the other hand, when calculating the total rate of valid data of the SLC block group by assuming that the capacity of SLC block Ss is ½ of the capacity of MLC block Sm, it is possible to prevent the SLC block group from tending to be selected.

Further, when limitations of the number of blocks Bm and the rate of valid data Vm of the MLC block group shown in FIG. 17 are added to the example shown in FIG. 18, as shown in FIG. 19, in the same manner as in steps S201 to S203 shown in FIG. 17, the transcription source block group selection unit 108 calculates the total rate of valid data Vm of the MLC block group, and then, in the same manner as in steps S204 and S205 shown in FIG. 17, determines whether or not the total number of blocks Bm in the MLC block group is smaller than or equal to a predetermined threshold value Tbm (step S204), and if the total number of blocks Bm is greater than the threshold value Tbm (NO in step S204), the transcription source block group selection unit 108 subsequently determines whether or not the total rate of valid data Vm of the MLC block group is greater than a predetermined threshold value Tvm (step S205).

When the total number of blocks Bm is smaller than or equal to the threshold value Tbm (YES in step S204), or when the total rate of valid data Vm is greater than the threshold value Tvm (YES in step S205), the transcription source block group selection unit 108 selects the SLC block group as the transcription source block group (step S206). On the other hand, when the total number of blocks Bm is greater than the threshold value Tbm and when the total rate of valid data Vm is smaller than or equal to the threshold value Tvm (NO in step S204 and NO in step S205), in the same manner as in steps S221 to S223 shown in FIG. 18, the transcription source block group selection unit 108 calculates the total rate of valid data Vs of the SLC block group. Then, the transcription source block group selection unit 108 compares the total rate of valid data Vm of the MLC block group calculated in step S203 and the total rate of valid data Vs of the SLC block group calculated in step S223 (step S224), and when the total rate of valid data Vs of the SLC block group is smaller than or equal to the total rate of valid data Vm of the MLC block group (YES in step S224), the transcription source block group selection unit 108 selects the SLC block group as the transcription source block group (step S206). On the other hand, when the total rate of valid data Vs is greater than the total rate of valid data Vm (NO in step S224), the transcription source block group selection unit 108 selects the MLC block group as the transcription source block group (step S207). When selecting the transcription source block group in this way, the transcription source block group selection unit 108 returns to the operation shown in FIG. 15, 16A, or 16B, and returns the processing to the block reduction processing unit 107.

In the transcription source block group selection processing shown in FIG. 18, for example, when the total number of blocks Bm in the MLC block group is one and the total amount of valid data Dm is one cluster, the total rate of valid data Vm of the MLC block group is very low, so that the MLC block group may be selected as the transcription source. In such a case, even when the MLC block group is selected as the transcription source, the number of used blocks cannot be reduced. Also, both the total rates of valid data Vs and Vm may be near 100%. As an extreme example, there is a case in which, for example, both the numbers of blocks Bs and Bm are 100, the total rate of valid data Vs is 100%, and the total rate of valid data Vm is 99%. In this case, in the transcription source block group selection processing shown in FIG. 18, the MLC block group is selected as the transcription source. As a result, to reduce one block, it is necessary to select 100 MLC blocks as the transcription source and select 99 free blocks as the transcription destination. Therefore, as shown in FIG. 19, by adding limitations to the number of blocks Bm and the rate of valid data Vm of the MLC block group, even when Vs>Vm, the SLC block group is selected as the transcription source.

Figure 20:
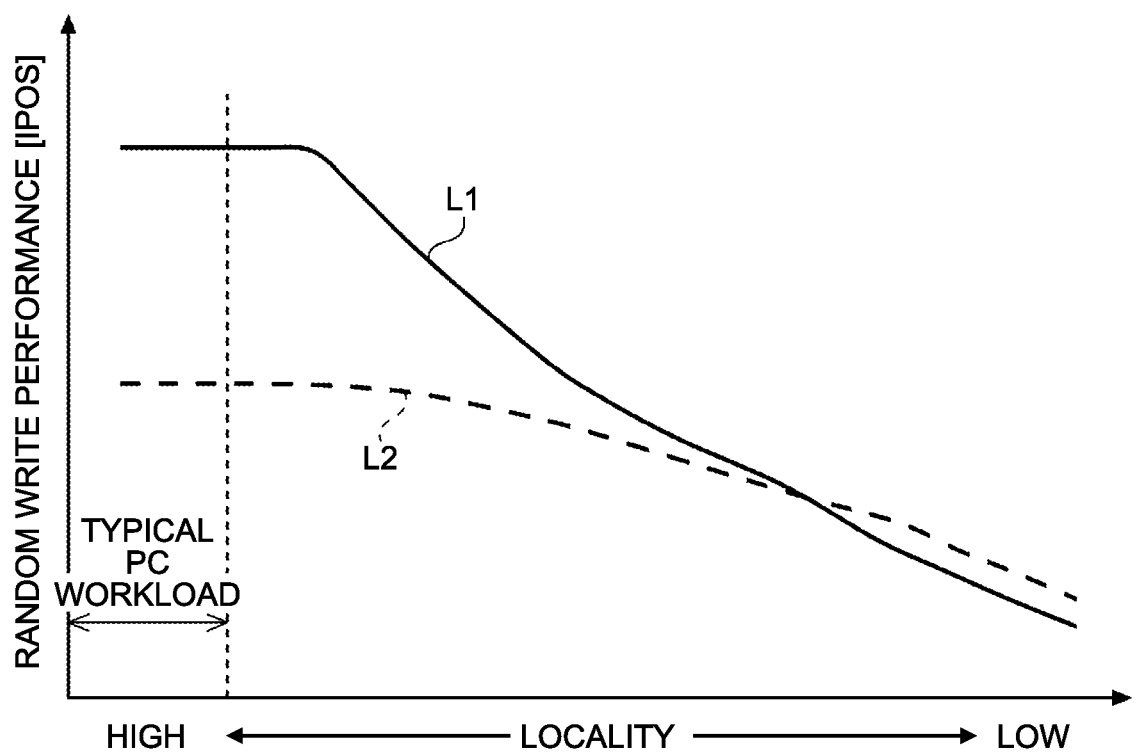
FIG. 20 is a simulation result of random write in the embodiment.

FIG. 20 shows a simulation result of random write. The X axis of FIG. 20 indicates the size of access range, in other words, indicates locality, and the range is 0 to the logical capacity. The Y axis indicates random write performance with respect to data of 4 KB, the unit of performance is IOPS. In FIG. 20, the solid line L1 is a curve showing the random write performance of the memory system 1, and the dashed line L2 is a curve showing the random write performance of a conventional memory system that uses all blocks in the MLC mode. As obvious from FIG. 20, in the memory system 1, random write performance better than that of the conventional memory system can be obtained, in particular, in a range with high locality.

As described above, according to the first embodiment, in an access pattern with strong locality, data that is not updated frequently is divided into the MLC block and data that is updated frequently is divided into the SLC block, so that it is possible to improve long-term transcription efficiency. When the total amount of valid data is small, it is possible to reduce useless transcription of the SLC blocks and increase the cache effect of the SLC blocks with high access speed. In addition, by dynamically selecting the operation mode of the free block, it is possible to obtain the merit of SLC flash memory and the merit of MLC flash memory depending on the situation.

Next, a memory system 2 according to a second embodiment will be described in detail with reference to the drawings. In the second embodiment, the execution of the used block reduction processing shown in step S112 in FIG. 14 is triggered when a command such as read, write, flush, and deletion of data is not received from the host device 150 for a certain period of time, and when a transcription of data is requested from the host device 150, in addition to when the number of free blocks is smaller than or equal to a predetermined threshold value Tbf (YES in step S111 in FIG. 14).

Figure 21:
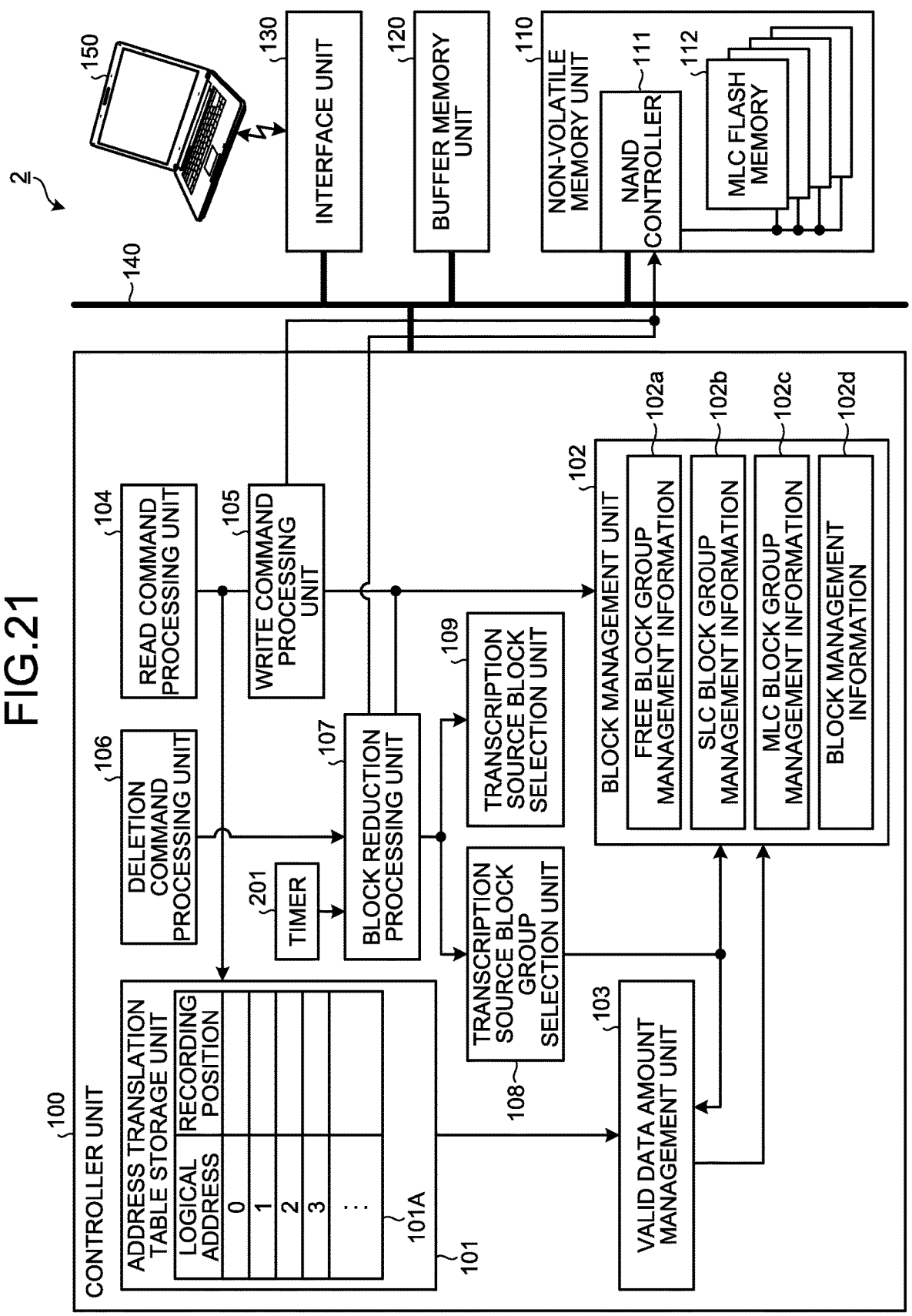
FIG. 21 is a block diagram of a memory system of a second embodiment.

As obvious from comparison between FIG. 21 and FIG. 5, the memory system 2 according to the second embodiment includes a timer 201 in addition to the same configuration as that of the memory system 1 shown in FIG. 5. The timer 201 is configured by an up-counter, and when the count value is greater than or equal to a predetermined value, the timer 201 sends a used block reduction request to the block reduction processing unit 107. The block reduction processing unit 107 performs the used block reduction processing shown in FIG. 15, 16A, or 16B in accordance with the request.

Figure 22:
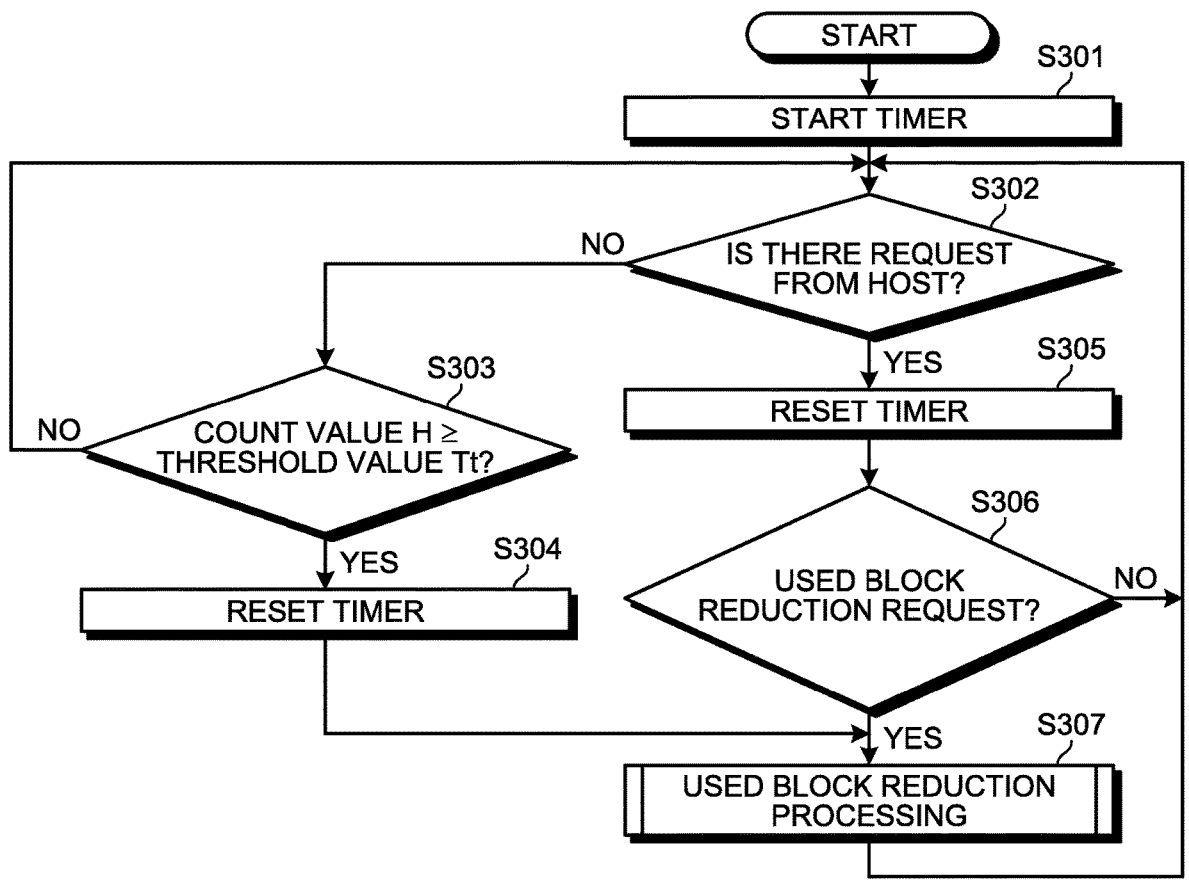
FIG. 22 is a schematic flowchart of execution of the used blocks reduction processing in the embodiment.

FIG. 22 is a flowchart showing a schematic operation when the used block reduction processing is performed on the basis of the count value of the timer. As shown in FIG. 22, the block reduction processing unit 107 starts the timer 201 (step S301), and thereafter, for example at regular intervals, determines whether or not a command is received from the host device 150 (step S302). When a command is not received (NO in step S302), the block reduction processing unit 107 determines whether or not a count value H of the timer 201 is greater than or equal to a predetermined threshold value Tt (step S303). When the count value H is smaller than the threshold value Tt (NO in step S303), the block reduction processing unit 107 directly returns to step S302. On the other hand, when the count value H is greater than or equal to the threshold value Tt (YES in step S303), the block reduction processing unit 107 resets the timer 201 (step S304). Thereafter, in the same manner as in step S112 in FIG. 14, the block reduction processing unit 107 performs the used block reduction processing (step S307), and then returns to step S302.

When a command is received from the host device 150 (YES in step S302), the block reduction processing unit 107 resets the timer 201 (step S305), and subsequently determines whether or not the received command is the used block reduction request (step S306). When the received command is not the used block reduction request (NO in step S306), the block reduction processing unit 107 directly returns to step S302. On the other hand, when the received command is the used block reduction request (YES in step S306), in the same manner as in step S112 in FIG. 14, the block reduction processing unit 107 performs the used block reduction processing (step S307), and then returns to step S302.

As described above, according to the second embodiment, when a command is not sent from the host for a certain period of time, it is estimated that the period in which command is not sent will continue, so that the used block reduction processing can be performed during the period. Regarding the command for instructing reduction of the number of used blocks, it can be expected that the host sends the command on the basis that the host recognizes that the host will not access data for a while. Therefore, although the used block reduction processing cannot be reduced in total, by performing the used block reduction processing in advance during a period in which the host does not access data, it is possible to reduce the used block reduction processing that should be performed in parallel with writing from the host and suppress degradation of the transmission performance when the host writes data. Other configurations, operations, and effects are the same as those of the first embodiment, so that the detailed description thereof will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A memory system comprising:
a non-volatile semiconductor memory having a plurality of first storage areas, the first storage areas being capable of including one or more second storage areas, a plurality of third storage areas in which data is written in a first mode, and a plurality of fourth storage areas in which data is written in a second mode, the first mode being different from the second mode; and
processing circuitry, wherein
the processing circuitry performs a used block reduction processing that repeatedly performs:
acquiring one or more second storage areas from the plurality of first storage areas;

selecting a plurality of storage areas from the plurality of third storage areas or from the plurality of fourth storage areas, when an elapsed time measured by a timer reaches a specific time or when a period without access from a host reaches a specific time;

writing the valid data stored in the selected plurality of storage areas in the acquired one or more second storage areas using the second mode;

obtaining a number of reduced blocks by subtracting a total number of the selected plurality of storage areas from a total number of the acquired second storage areas; and determining whether the number of reduced blocks is greater than or equal to a predetermined number, and the processing circuitry terminates, when the number of reduced blocks is greater than or equal to the predetermined number, the used block reduction processing.

2. The system according to claim 1, wherein a write speed or a read speed of the second mode is slower than that of the first mode.

3. The system according to claim 1, wherein a maximum write data amount per unit area of the second mode is greater than that of the first mode.

4. The system according to claim 1, further comprising a plurality of the semiconductor memories, wherein the processing circuitry is configured to execute parallel data transfer with respect to the plurality of semiconductor memories.

5. The system according to claim 1, wherein the processing circuitry selects the plurality of storage areas at one time, and the processing circuitry acquires the one or more second storage areas at one time, the one or more second storage areas being one or more write targets of the valid data stored in the selected storage areas.

6. The system according to claim 1, wherein the processing circuitry acquires the one or more second storage areas one by one, the one or more second storage areas being one or more write targets of the valid data stored in the selected storage areas, and the processing circuitry selects the plurality of third storage areas or the plurality of fourth storage areas one by one, which store the valid data to be written in the acquired one or more second storage areas.

7. The system according to claim 1, wherein the processing circuitry selects, when the number of the fourth storage areas is equal to or smaller than a first threshold value or when a total rate of valid data in the fourth storage areas is greater than a second threshold value, the plurality of storage areas from the plurality of third storage areas, and selects, when the number of the fourth storage areas is greater than the first threshold value and the total rate of valid data in the fourth storage areas is equal to or smaller than the second threshold value, the plurality of storage areas from the fourth storage areas, and the total rate of valid data in the fourth storage areas is a rate of the total amount of valid data stored in the fourth storage areas with respect to the total capacity of the fourth storage areas.

8. The system according to claim 1, wherein all of the plurality of first storage areas accept write operation in both of the first mode and the second mode.

9. The system according to claim 1, wherein the processing circuitry performs the used block reduction processing in parallel with the write operation in response to a request from a host.

10. The system according to claim 1, further comprising the timer configured to measure the elapsed time.

11. The system according to claim 10, wherein the processing circuitry restarts the timer in response to performing the used block reduction processing.

12. The system according to claim 10, wherein the processing circuitry resets the timer in response to an access from the host.

13. The system according to claim 1, wherein the processing circuitry selects, when a total rate of valid data in the third storage areas is equal to or smaller than a total rate of valid data in the fourth storage areas, the plurality of storage areas from the third storage areas, and selects, when the total rate of valid data in the third storage areas is greater than the total rate of valid data in the fourth storage areas, the plurality of storage areas from the fourth storage areas, the total rate of valid data in the third storage areas is a rate of the total amount of valid data stored in the third storage areas with respect to the total capacity of the third storage areas, and the total rate of valid data in the fourth storage areas is a rate of the total amount of valid data stored in the fourth storage areas with respect to the total capacity of the fourth storage areas.

14. The system according to claim 13, further comprising a data amount management unit configured to calculate the total rate of valid data in the third storage areas and the total rate of valid data in the fourth storage areas on the basis of a block capacity according to an operation mode of each block.

15. The memory system according to claim 1, wherein the one or more second storage areas are areas without valid data, the plurality of third storage areas are areas where data write requested from a host is written, the plurality of fourth storage areas are areas where data having been stored in the third storage areas is rewritten, the processing circuitry acquires the one or more second storage areas based on first management information, and the processing circuitry selects the plurality of storage areas from the plurality of third storage areas based on second management information or selects the plurality of storage areas from the plurality of fourth storage areas based on third management information such that the selection is limited to either third storage areas or fourth storages areas, but not both, and the processing circuitry deletes, when the valid data stored in the selected storage areas is written in the acquired second storage areas, the selected one or more storage areas from the second management information or the third management information, and add the one or more second storage areas where the valid data is written in the first management information.

16. The system according to claim 15, wherein, the processing circuitry selects the plurality of storage areas from the plurality of third storage areas in the order of writing based on the second management information.

17. The system according to claim 15, the processing circuitry suspends the deletion of the selected plurality of storage areas from the second management information or the third management information until the processing circuitry finishes writing the valid data into the acquired one or more second storage areas.

18. The system according to claim 15, wherein
the valid data is data stored in a physical address associated with a logical address,
the first management information indicates which area among the plurality of first storage areas is the second storage area,
the second management information indicates which area among the plurality of first storage areas is the third storage area, and
the third management information indicates which area among the plurality of first storage areas is the fourth storage area.

19. The system according to claim 18, further comprising:
a first storage that stores the first management information;
a second storage that stores the second management information; and
a third storage that stores the third management information,
wherein the logical address is an address specified by the host, and
the physical address indicates a storage position of data in the storage areas of the semiconductor memory.

20. The system according to claim 18, further comprising an address mapping table configured to manage a correspondence relationship between the logical address and the physical address,
wherein the address mapping table includes a reverse table capable of searching a logical address of each entry based on a storage position of each entry.

* * * * *